United States Patent
Fukae et al.

(10) Patent No.: US 7,177,283 B2
(45) Date of Patent: Feb. 13, 2007

(54) TRANSMITTING AND RECEIVING CIRCUIT AND TRANSMITTING AND RECEIVING METHOD

(75) Inventors: Fumihiro Fukae, Sakurai (JP); Yuji Ichikawa, Tenri (JP)

(73) Assignee: Sharp Kabushiki Kaisha, Abeno-ku (JP)

( * ) Notice: Subject to any disclaimer, the term of this patent is extended or adjusted under 35 U.S.C. 154(b) by 960 days.

(21) Appl. No.: 10/157,863

(22) Filed: May 31, 2002

(65) Prior Publication Data
US 2002/0199051 A1 Dec. 26, 2002

(30) Foreign Application Priority Data
Jun. 1, 2001 (JP) .............................. 2001-167394

(51) Int. Cl.
*H04L 12/26* (2006.01)
(52) U.S. Cl. ..................................................... 370/252
(58) Field of Classification Search ................ None
See application file for complete search history.

(56) References Cited

U.S. PATENT DOCUMENTS

| | | | | |
|---|---|---|---|---|
| 5,504,757 | A * | 4/1996 | Cook et al. ................ | 370/468 |
| 6,397,277 | B1 * | 5/2002 | Kato et al. ................. | 710/104 |
| 6,477,171 | B1 * | 11/2002 | Wakeley et al. ........... | 370/404 |
| 6,509,988 | B1 * | 1/2003 | Saito ........................ | 710/105 |
| 6,556,589 | B2 * | 4/2003 | McRobert et al. ......... | 370/501 |
| 6,603,741 | B1 * | 8/2003 | Poulter et al. ............. | 370/252 |
| 6,771,694 | B1 * | 8/2004 | Baumgartner .............. | 375/220 |
| 6,871,241 | B2 * | 3/2005 | Fukae et al. ............... | 710/15 |
| 6,950,408 | B1 * | 9/2005 | Domon et al. ............. | 370/257 |
| 7,068,609 | B2 * | 6/2006 | Huff ........................ | 370/252 |

FOREIGN PATENT DOCUMENTS

| | | |
|---|---|---|
| JP | 5-176148 A | 7/1993 |
| JP | 11-098159 | 4/1999 |
| JP | 11-98159 A | 4/1999 |
| JP | 2000-101680 A | 4/2000 |

* cited by examiner

*Primary Examiner*—Chi Pham
*Assistant Examiner*—Anh-Vu Ly
(74) *Attorney, Agent, or Firm*—Birch, Stewart, Kolasch & Birch, LLP

(57) ABSTRACT

A transmitting and receiving circuit includes an optical circuit for transmitting and receiving data from and to a facing node, and a speed negotiation state machine for executing a speed negotiation to find a maximum value of a data transfer speed in a channel between nodes before data transfer to the facing node, and setting the thus obtained maximum value as a maximum transfer speed of each transceiver. With this, the speed negotiation is executed with the facing node for each transceiver before data transfer, and the transfer speed of the node is determined by the result of the speed negotiation, so that it is possible to provide a transmitting and receiving circuit and a transmitting and receiving method such that data transfer becomes possible even in a channel of poor quality.

19 Claims, 12 Drawing Sheets

FIG. 2

| ADDRESS | CONTENTS | | | | | | | |
|---|---|---|---|---|---|---|---|---|
| | 0 | 1 | 2 | 3 | 4 | 5 | 6 | 7 |
| 0000 | Physical-ID | | | | | | R | PS |
| 0001 | RHB | IBR | Gap-count | | | | | |
| 0010 | SPD | | E | #Ports | | | | |
| 0011 | AStat0 | | BStat0 | | Ch0 | Con0 | Reserved | |
| 0100 | AStat1 | | BStat1 | | Ch1 | Con1 | Reserved | |

FIG. 3 transmitted first

| 10 | phy_ID | 0 | L | gap_count | sp | rsv | c | pwr | p0 | p1 | p2 | i | m |
|---|---|---|---|---|---|---|---|---|---|---|---|---|---|
| logical inverse of first quadlet | | | | | | | | | | | | | |

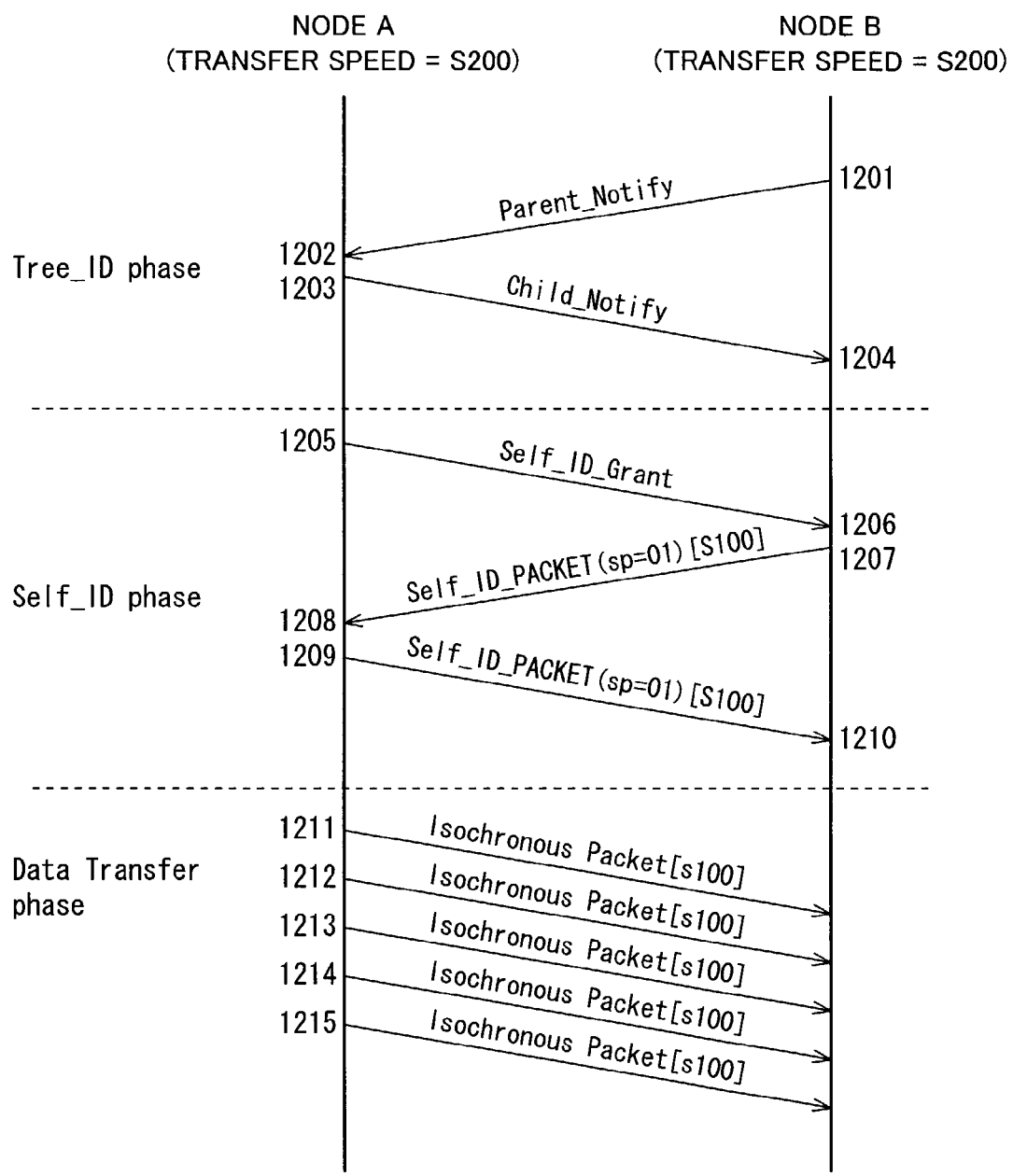

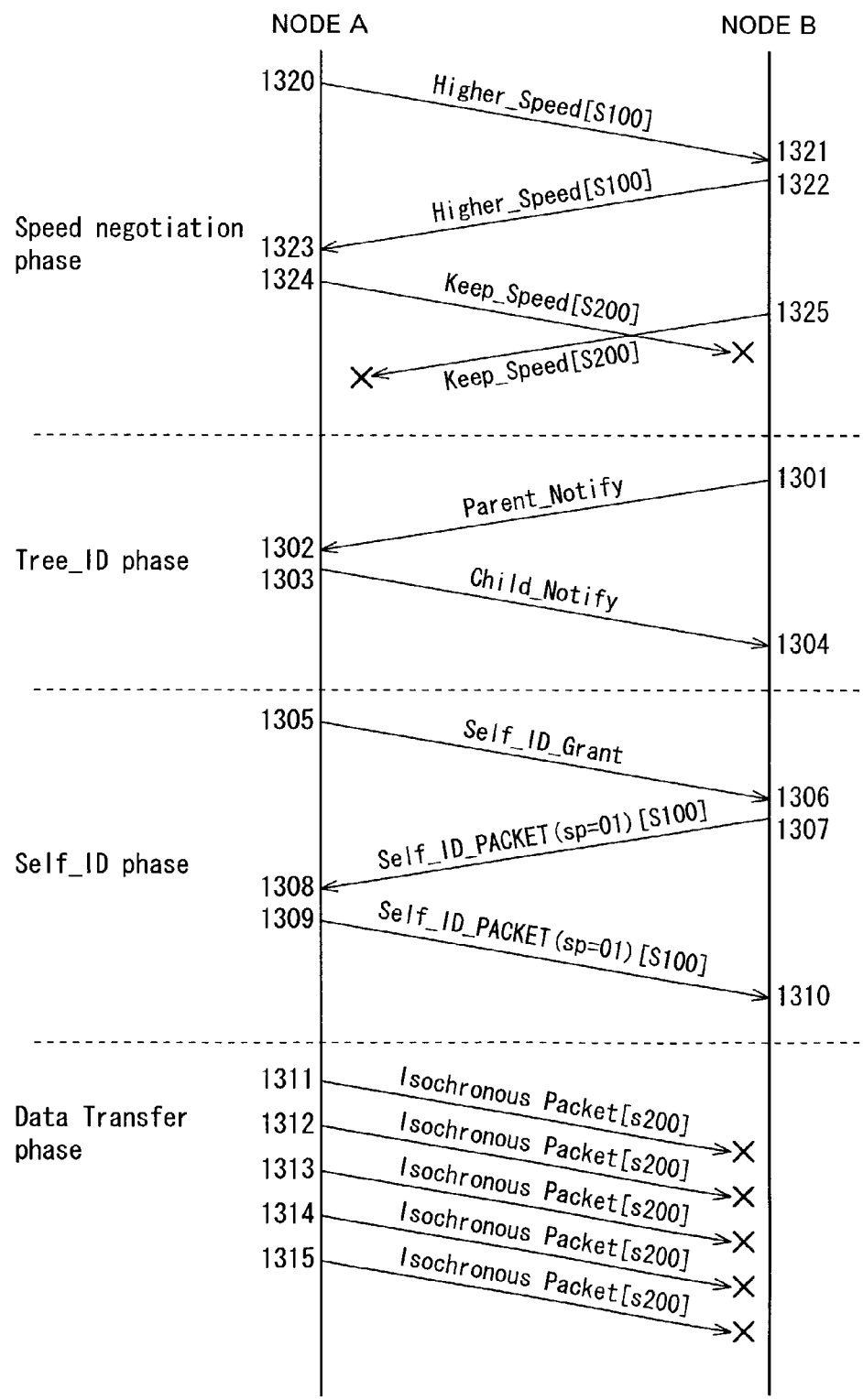

TRANSMITTING AND RECEIVING CIRCUIT AND TRANSMITTING AND RECEIVING METHOD

FIELD OF THE INVENTION

The present invention relates to a transmitting and receiving circuit and a transmitting and receiving method, and the transmitting and receiving circuit is used in a serial bus, which is capable of connecting to personal computers, computer peripheral devices, and audio and visual apparatuses, such as a high speed performance serial bus which is standardized by "IEEE Standard for a High Performance Serial Bus", -IEEE Std. 1394-1995-(hereinafter referred to as "IEEE Std. 1394-1995") issued by Institute of Electrical and Electronic Engineers (IEEE) (hereinafter referred to as "1394 serial bus").

BACKGROUND OF THE INVENTION

Between a personal computer and peripheral devices such as a printer, a hard disk, and an image scanner, visual apparatuses such as a digital camera, and audio apparatuses (such terminal apparatuses are hereinafter referred to as "node"), considered is a network which is provided with nodes with a 1394 serial bus (hereinafter referred to as "1394 serial bus node") to transfer a control signal or a main signal.

FIG. 11 is a drawing of an example of a physical layer circuit of a conventional node, which is a typical structure of a physical layer circuit described in p. 92 of IEEE Std. 1394-1995 (hereinafter referred to as "1394 physical layer circuit") Incidentally, Japanese Laid-Open Patent Publication No. 98159/1999 (*Tokukaihei* 11-98159, published on Apr. 9, 1999) discloses a transmitting and receiving circuit having this type of physical layer circuit).

As shown in FIG. 11, the 1394 physical layer circuit is provided with three transceiver circuits 1105, 1106, and 1107 which are standardized with the IEEE Std. 1394-1995 (hereinafter referred to as "1394 metal transceiver circuit"), a DS-link encoder/decoder circuit 1102, a link layer interface circuit 1103, a bus arbitration circuit 1101, and a register circuit 1104.

Each of the 1394 metal transceiver circuits 1105, 1106, and 1107 passes a main signal (data signal) and a control signal with other node through two pairs of cables (buses).

The DS-link encoder/decoder circuit 1102 encodes/decodes a data signal outputted from an upper layer, a link layer interface circuit 1103, by a DS-link encoding mode to transmit and receive it on the bus. The DS-link encoding mode is an encoding method of transmitting these data signal and strobe signal through a pair of lines, one line for the data signal and the other line for the strobe signal, where an exclusive OR of the data signal and the strobe signal is a sampling clock of a receiver-side node.

The link layer interface circuit 1103 passes the data signal and the control signal with a further upper layer, a link layer (not shown).

The bus arbitration circuit 1101 carries out various settings for operation of the 1394 physical layer circuits and controls timings for transmission of the data signal and the control signal to the 1394 serial bus. The bus arbitration circuit 1101 is connected to the register circuit 1104 in which operational conditions for the 1394 physical layer circuit are listed, and the 1394 physical layer circuit operates in accordance with the conditions listed in the register circuit 1104.

The register circuit 1104 is usually controlled by the link layer as an upper layer, and the link layer read and rewrite information in the register circuit 1104 via the link layer interface circuit 1103.

The contents listed in the register circuit 1104 are indicated in the form of a register map. For example, a register map of FIG. 2 shows the register map described in p. 341 of the IEEE Std. 1394-1995. According to the IEEE Std. 1394-1995, only a control operation by the link layer is allowed to rewrite information in the register map.

In the register map shown in FIG. 2, a maximum operation speed of the 1394 physical layer circuit is listed in a [SPD] region, which is stored in the high-order two bits at an address of 0010. Incidentally, the IEEE Std. 1394-1995 defines three types of maximum operation speeds (hereinafter referred to as "maximum speed") of the 1394 physical layer circuit: 100 Mbps, 200 Mbps, and 400 Mbps (hereinafter referred to as "S100", "S200", and "S400", respectively). The maximum speed is selected among these three types of the maximum speeds depending on the performance of the 1394 physical layer circuit.

Values in the [SPD] region inside the register map: (00), (01), and (10) correspond to the maximum speeds: S100, S200, and S400, respectively. For example, when (01) is set in the [SPD] region, a node transmits the control signal, which indicates a maximum speed that the self-node can process, to facing nodes which are connected to the respective 1394 metal transceiver circuits 1105, 1106, and 1107 of the self-node. As a result, the maximum speed of signals transmitted from the nodes becomes S200.

FIG. 12 is a timing chart from a Tree_ID phase to a Data Transfer phase with respect to the IEEE Std. 1394-1995, giving an example of a Peer to Peer connection between a node A and a node B. In FIG. 12, it is defined that both facing output ports of the node A and the node B have a maximum speed of S200, and the node A and the node B also have a maximum speed of S200. Furthermore, reference numerals 1201 through 1215 in FIG. 12 represents timings of transmitting and receiving codes with respect to each of the nodes.

Generally, in the IEEE Std. 1394-1995, each connected node first shifts to the Tree_ID phase. In the Tree_ID phase, the node that transmits a Parent_Notify and receives a Child_Notify becomes a child node, and the node that receives a Parent_Notify and transmits a Child_Notify becomes a parent node.

Operation in the above Tree_ID phase is carried out between all the facing nodes which are connected on the buses. With respect to each node, the node that last transmits a Child_Notify becomes a root to manage the bus in subsequent phases. In FIG. 12, the node A is a root.

After the Tree_ID phase ends, the phase is shifted to a Self_ID phase. In the Self_ID phase, all the nodes transmit on the buses their own node IDs and maximum speeds in accordance with a format of a Self_ID packet shown in FIG. 3.

With respect to the format of the Self_ID packet, the node_ID and the maximum speed of the self-node are assigned in fields of phy_ID and sp, respectively.

In FIG. 12, since both the node A and the node B have the maximum speed of S200, "01" which represents S200 is assigned in the sp field of the Self_ID packet. If a node has a maximum speed of S100, "00" is assigned in the sp field; if S400, "10" is assigned.

In the Self_ID phase, all the nodes transmit the respective Self_ID packets on the buses and receive the foregoing Self_ID packets, so that it is possible to know the maximum speed of all the nodes which exist on the buses.

Furthermore, since all the nodes on the buses must be able to receive the Self_ID packets, the IEEE Std. 1394-1995 defines that the Self_ID packet shall be transmitted at a speed of S100. In FIG. 12, in the Self_ID phase, the node A and the node B know each other to have a maximum speed of S200.

When all the nodes on the buses finishes to transmit their Self_ID packets, the phase is shifted to a Data Transfer phase, and then data transfer becomes possible under management of the root node.

In recent years, an attempt has been made to utilize the IEEE Std. 1394-1995 for networks at home. However, the IEEE Std. 1394-1995 defines that a maximum length of a metal cable shall be 4.5 m. This often requires inconvenience with regard to limitation of a cable length.

In this regard, a long-distance transmission can be provided by replacing at least one of the plurality of 1394 metal transceiver circuits in the 1394 physical layer circuit, for example, with an optical transceiver circuit, and by the channel replacing a metal cable with an optical fiber such as a POF (Plastic Optical Fiber).

In a DAVIC (Digital Audio-Visual Council), which is a standard for communications with a channel of an optical fiber, in order to secure a quality of a channel (a quality of communications), speed negotiation is carried out between nodes. As a communication speed gets high in the future, it becomes necessary to carry out speed negotiation between nodes so as to secure a quality of a channel, regardless of a channel of an optical fiber or a metal cable.

Here, considered is the case where the metal cable is replaced with the optical fiber, or the 1394 metal transceiver circuit is replaced with the optical transceiver circuit for expansion of a transmission distance, as described before.

In the channel of the metal cable, for example, when packets based on the IEEE Std. 1394-1995, which have transfer speeds of S100 and S200, respectively, are transmitted continuously, a receiver side generates a clock from an exclusive OR of a data signal and a strobe signal of a received packet, and samples data in accordance with the clock thus generated In this manner, it is possible to properly receive the foregoing continuous packets of different transfer speeds.

However, in communications with the channel of the optical fiber, the transfer speed of packets is high. This makes it impossible to carry out clock synchronization of received data in a packet cycle. As a result, it is impossible to carry out clock synchronization for each packet.

In this regard, the following method is used: before data communications is started, each pair of the facing transceiver circuits carries out speed negotiation to determine a maximum transfer speed at which they can communicate with each other. In the subsequent operation, the thus determined transfer speed is adopted in the data communications between the facing transceiver circuits.

However, degradation of the optical fiber or an optical fiber length causes increase in a rate of error occurrence (error rate) in a channel during data transfer, and this may stop data transfer of S200, despite, for example, a communication system in which optical transceiver circuits having the maximum speed of S200 are connected. In other words, when the error rate gets a certain value or more, data cannot be transferred in the channel. FIG. 13 is a timing chart from the Speed negotiation phase to the Data transfer phase in the aforementioned case. Incidentally, reference numerals 1301 through 1315 and 1320 through 1325 represent timings of transmitting and receiving of codes with respect to each of the nodes.

In FIG. 13, the node A and the node B transmit to each other a Higher_Speed, which is a code that represents a request for raise in transfer speed, at a transfer speed of S100 at the timings of 1320 and 1322. When receiving the Higher_Speed from each other, the node A and the node B recognize that transmitting and receiving is possible at the minimum transfer speed of S100. Further, since their own transceiver circuits have a maximum speed of S200, the nodes A and B transmits to each other a Keep_Speed, which is a code that represents a request for maintenance of transfer speed, at a transfer speed of S200 at the subsequent timings of 1324 and 1325. In case where the maximum speed of the nodes A and B exceeds S200, the above negotiation is repeatedly carried out until the communication speed becomes the maximum speed.

Since it is assumed in this case that an error rate is in such a degree that data cannot be transmitted and received at S200, the nodes A and B cannot receive the Keep_Speed from each other. Since they cannot receive the Keep_Speed at the transfer speed of S200, they give up their negotiation and transmit an End_Negotiation (not shown), which is a code that represents a request for end of speed negotiation, at a transfer speed of S100. When receiving the End_Negotiation from each other, they end the Speed Negotiation phase.

Since a sequence of the Tree_ID phase shown in FIG. 13 is the same as that of FIG. 12, an explanation of thereof is omitted here.

In a Self_ID phase, the node A and the node B input "01" in the respective sp fields of Self_ID Packets to transmit on the bus since their own transceiver circuits have the maximum speed of S200.

Further, when receiving the Self_ID Packet, which includes "01" in the sp field, transmitted by the node B, the node A recognizes that data transfer at S200 is possible. In a Data transfer phase, a physical layer circuit of the node A therefore outputs to its transceiver circuit data for instructing to transmit an Isochronous Packet of S200. The transceiver circuit of the node A transmits the Isochronous Packet of S200 at the timings of 1311, 1312, 1313, 1314, and 1315 at a transfer speed of S100.

In this case, it is impossible to properly transmit packets of S200 at the transfer speed of S100, and a possibility that an incorrect data is transmitted is very high.

Thus, FIG. 13 shows a Peer to Peer connection between the node A and the node B. However, even in case of daisy-chained plural nodes, a high error rate in a channel at some midpoint between nodes may make data transfer between both end of the nodes impossible.

SUMMARY OF THE INVENTION

An object of the present invention is to provide a transmitting and receiving circuit and a transmitting and receiving method in which transceivers carries out a speed negotiation with each other with respect to facing nodes and determine a transfer speed of the nodes from the result of the negotiation before a data transfer, so that the data transfer becomes possible between facing nodes even in a channel with an inferior quality.

To achieve the above object, a transmitting and receiving circuit of the present invention includes:

a plurality of transceivers for transmitting and receiving data to and from a facing node at plural different data transfer speeds; and a speed setting circuit which detects a data transfer speed in a channel between nodes and sets a maximum data transfer speed in accordance with a thus detected value with respect to each of the transceivers.

According to the above arrangement, since the maximum data transfer possible speed of the transceiver is set to be the data transfer speed detected in the channel between the nodes, thereby ensuring data transfer in the channel at a speed possible to transfer data. In other words, regardless of a quality of the channel, data transfer can be carried out at a speed corresponding to the quality of the channel.

This makes it possible to ensure data transfer to a facing node even in case where a channel is so poor as to be unable to carry out data transfer at an original maximum data transfer possible speed of the transceiver.

Further, to achieve the above object, a transmitting and receiving method of the present invention includes the steps of:

(a) executing a speed negotiation for finding a maximum value of a data transfer speed for each of the transceivers with respect to a channel between the nodes before data transfer; and (b) setting a thus obtained maximum value as a maximum data transfer speed with respect to each of the transceivers, when data are transmitted and received between nodes whose transceivers, capable of data transfer at plural transfer speeds, are connected to each other, the transceiver.

According to the above arrangement, the data transfer speed is determined corresponding to the quality of the channel between the nodes before data transfer, and data transfer is carried out at this transfer speed, thereby ensuring data transfer.

For a fuller understanding of the nature and advantages of the invention, reference should be made to the ensuing detailed description taken in conjunction with the accompanying drawings.

BRIEF DESCRIPTION OF THE DRAWINGS

FIG. 2 is a drawing showing a register map of a register circuit which is provided in the transmitting and receiving circuit FIG. 3 is a drawing showing a format of a Self_ID packet which is based on IEEE Std.1394-1995.

FIG. 12 is a timing chart of a phase shift between nodes which provide maximum transfer speed of S200 when an error rate is low in a channel of S200.

FIG. 13 is a timing chart of a phase shift between nodes which provide maximum transfer speed of S200 when an error rate is high in a channel of S200.

DESCRIPTION OF THE EMBODIMENTS

[Embodiment 1]

The following will describe an embodiment of the present invention. Note that, in the present embodiment described is a transmitting and receiving circuit which is provided in a serial node corresponding to plural different data transfer speeds. Here, such a case is explained that IEEE Std. 1394-1995 (hereinafter referred to IEEE1394) is applied as a standard for communications between nodes.

Figure 1:
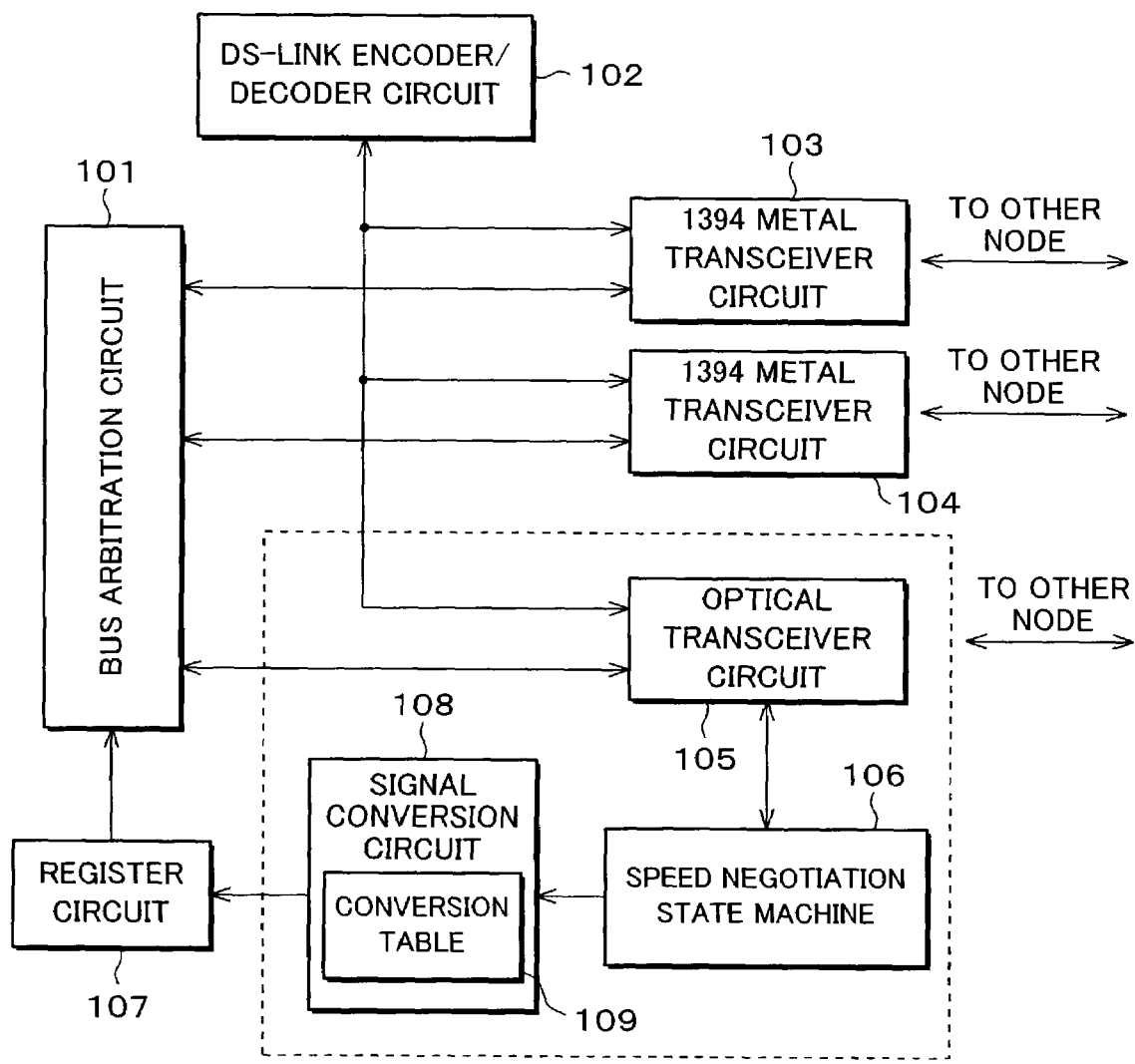
FIG. 1 is a block diagram of a transmitting and receiving circuit according to an embodiment of the present invention.

As shown in FIG. 1, the transmitting and receiving circuit according to the present embodiment is provided with two 1394 metal transceiver circuits 103 and 104, one optical transceiver circuit (transceiver) 105, a speed negotiation state machine (negotiation circuit) 106, a DS-link encoder/decoder circuit 102, a bus arbitration circuit (data transfer speed setting circuit) 101, a register circuit (data transfer speed setting circuit) 107, a signal conversion circuit (negotiation circuit) 108, and a conversion table (negotiation circuit) 109.

Note that, a block diagram shown in FIG. 1 is an example for realizing the present invention, and the present invention is not limited to this.

The transmitting and receiving circuit of the above arrangement is provided with a plurality of transceivers for transmitting and receiving data to and from a facing node, and a speed setting circuit which detects a data transfer speed in a channel between the nodes, and sets, in accordance with the values thus detected, a maximum data transfer possible speed with respect to each of the transceivers.

According to the above arrangement, since the maximum data transfer possible speed of the transceiver is set to be the data transfer speed detected in the channel between the nodes, thereby ensuring data transfer in the channel at a speed possible to transfer data. In other words, regardless of a quality of the channel, data transfer can be carried out at a speed corresponding to the quality of the channel.

This makes it possible to ensure data transfer to a facing node even in case where a channel is so poor as to be unable to carry out data transfer at an original maximum data transfer possible speed of the transceiver.

Further, the data transfer speed in the channel between the nodes may be detected, for example, by speed negotiation described later.

Incidentally, errors generally occur in a channel between nodes during data transfer. However, if a rate of the error occurrence is within a predetermined range, data transfer is possible without any problems. For example, in the case of OP i.LINK®, which is a standard for communications utilizing a channel of an optical fiber, an error rate (bit error rate) in a channel during data transfer is indicated by a ratio of bit error to the number of bit in whole data. When the rate is not more than $1.0 \times 10^{-12}$, data transfer in the channel is carried out without any problems.

Actually, when any bit error does not occur during speed negotiation (for several μsec) in which negotiation of a transfer speed is executed with other apparatus, a quality of the channel is regarded as good (not bad).

Further, with respect to data with errors, that is, data which include a bit error, the bit error can be recovered by comparison with preceding and subsequent data. For example, with respect to data inside a packet, error recovery is possible by using codes such as CRC code for error detection and a Reed•solomon code for error correction.

Here, error detection by the CRC code is explained below.

For example, in the IEEE1394, a particular packet (a PHY packet of a fixed 64 bit length) has inverse high-order 32 bits and low-order 32 bits, and a receiver side detects errors. Further, the CRC code for error detection is added to packets other than the PHY packet, and packets are resent, if necessary.

Further, with respect to an arbitration signal, a receiver side calculates a running disparity (a value which shows how many bits include "1" out of 10 bits: −1, 0, or 1), which is particular to 8B10B coding, to judge the presence of errors. Actually, when a received arbitration signal has errors, the immediately preceding arbitration signal is maintained so as to ensure a bus.

Still further, in the communications in accordance with the IEEE1394, most part of the communications is the transmitting and receiving of IDLE (arbitration signal), and a channel which has an error rate of the order of 1 bit in several hours is regarded as the one which has such a quality that data transfer is properly carried out.

Therefore, the data transfer speed in the channel between the above nodes has only to be such a speed that the error rate in the channel during data transfer is within a predetermined range.

In this case, since detected is such a data transfer speed that the error rate in the channel between the nodes during data transfer is within the predetermined range, the data transfer speed to ensure data transfer can be detected. This makes it further possible to ensure data transfer.

This means, before data transfer to a facing node, speed negotiation is carried out in order to find a maximum value of such a data transfer speed that an error rate in a channel between nodes during data transfer is within a predetermined range. The maximum value thus found is set for a maximum data transfer possible speed of each transceiver, so that it is possible to ensure data transfer to the facing node even when a channel has such a poor quality that data transfer cannot be carried out at an original maximum data transfer possible speed of a transceiver.

The above speed setting circuit is provided with the bus arbitration circuit 101, the speed negotiation state machine 106, the register circuit 107, the signal conversion circuit 108, and the conversion table 109, as shown in FIG. 1. The following will describe the circuit in detail.

Two 1394 metal transceiver circuits 103 and 104 have functions of (a) inputting and outputting a data signal from and to the DS-Link encoder/decoder circuit 102 by connecting to an encoder output and a decoder input of the DS-Link encoder/decoder circuit 102, of (b) inputting and outputting a control signal from and to the bus arbitration circuit 101 by connecting to the bus arbitration circuit 101, and of (c) transmitting and receiving the data signal and the control signal with a facing node (other node) via a medium of a cable.

The optical transceiver circuit 105 has functions of (a) inputting and outputting the data signal from and to the DS-link encoder/decoder circuit 102 by connecting to a decoder output and an encoder input of the DS-link encoder/decoder circuit 102, of (b) inputting and outputting the control signal from and to the bus arbitration circuit 101 by connecting to the bus arbitration circuit 101, of (c) inputting and outputting the transmission code and the reception code as a control code in speed negotiation from and to the speed negotiation state machine 106 by connecting to the speed negotiation state machine 106, and of (d) transmitting and receiving the data signal and the control signal with the facing node (other node) via a medium of an optical fiber.

Incidentally, in the optical transceiver circuit 105, it is effective to input and output a signal (a signal including the transmission code and the reception code) from and to the negotiation state machine 106 only when the speed negotiation is carried out.

The speed negotiation state machine 106 has functions of (a) inputting and outputting the transmission code and the reception code of the speed negotiation from and to the optical transceiver circuit 105 in accordance with information on a maximum transfer speed of the optical transceiver circuit 105 obtained from the register circuit 107 before data transfer by connecting to the register circuit 107 and the optical transceiver circuit 105, and of (b) informing the register circuit 107 the transfer speed of the optical transceiver circuit 105 and the facing node at the end of the speed negotiation.

The speed negotiation state machine 106, the signal conversion circuit 108, and the conversion table 109, are connected to the optical transceiver circuit 105 so as to make up of a negotiation circuit in which speed negotiation is carried out to find a maximum value of such a data transfer speed that an error rate in a channel between nodes during data transfer is within a predetermined range.

The DS-link encoder/decoder circuit 102 encodes data from the optical transceiver circuit 105 into a Data•Strobe signal and outputs it to the connected 1394 metal transceiver circuits 103 and 104. On the other hand, conversely, the DS link encoder/decoder circuit 102 decodes the Data-Strobe signal from the two 1394 metal transceiver circuits 103 and 104 and outputs it to the optical transceiver circuit 105.

The bus arbitration circuit 101, which is connected to three transceiver circuits: the two 1394 metal transceiver circuits 103 and 104, and the optical transceiver circuit 105, controls the input and output of signals in the three transceiver circuits. Further, the bus arbitration circuit 101 transfers setting information (maximum operation speed) of a self-node to each of the transceiver circuits.

The register circuit 107, which has a register map as shown in FIG. 2, is connected to the bus arbitration circuit 101 so as to read setting values from the bus arbitration circuit 101. Further, a [SPD] region of the register map in the register circuit 107 is connected to the signal conversion circuit 108.

Incidentally, the register circuit 107 and the bus arbitration circuit 101 make up of the data transfer speed setting circuit which sets the maximum value of the data transfer speed which is obtained from the result of the speed negotiation by the negotiation circuit (the speed negotiation state machine 106, the signal conversion circuit 108, and the conversion table 109) as a maximum data transfer possible speed with respect to the optical transceiver circuit 105.

The signal conversion circuit 108 is provided with the conversion table 109 which outputs "00" inside when the transfer speed after the speed negotiation is S100; outputs "01" when the transfer speed is S200; and outputs "10" when the transfer speed is "S400". The signal conversion circuit 108 generates the signal outputted to the register circuit 107 from the output signal of the speed negotiation state machine 106.

As described above, by inputting the transfer possible speed after the speed negotiation in the [SPD] region of the register circuit 107, it is possible to set the maximum operation speed of nodes to a lower transfer speed than the maximum operation speed of a transceiver (maximum transfer possible speed) in case where a channel of a high error rate is used.

According to the transmitting and receiving circuit of the above arrangement, before data transfer to a facing node, speed negotiation is carried out in order to find a maximum value of such a data transfer speed that an error rate in a channel between nodes during data transfer is within a predetermined range. The maximum value thus found is set for a maximum data transfer possible speed of each transceiver, so that it is possible to ensure data transfer to the facing node even when a channel has such a poor quality that data transfer cannot be carried out at an original maximum data transfer possible speed of a transceiver. This is detailed below.

Figure 4:
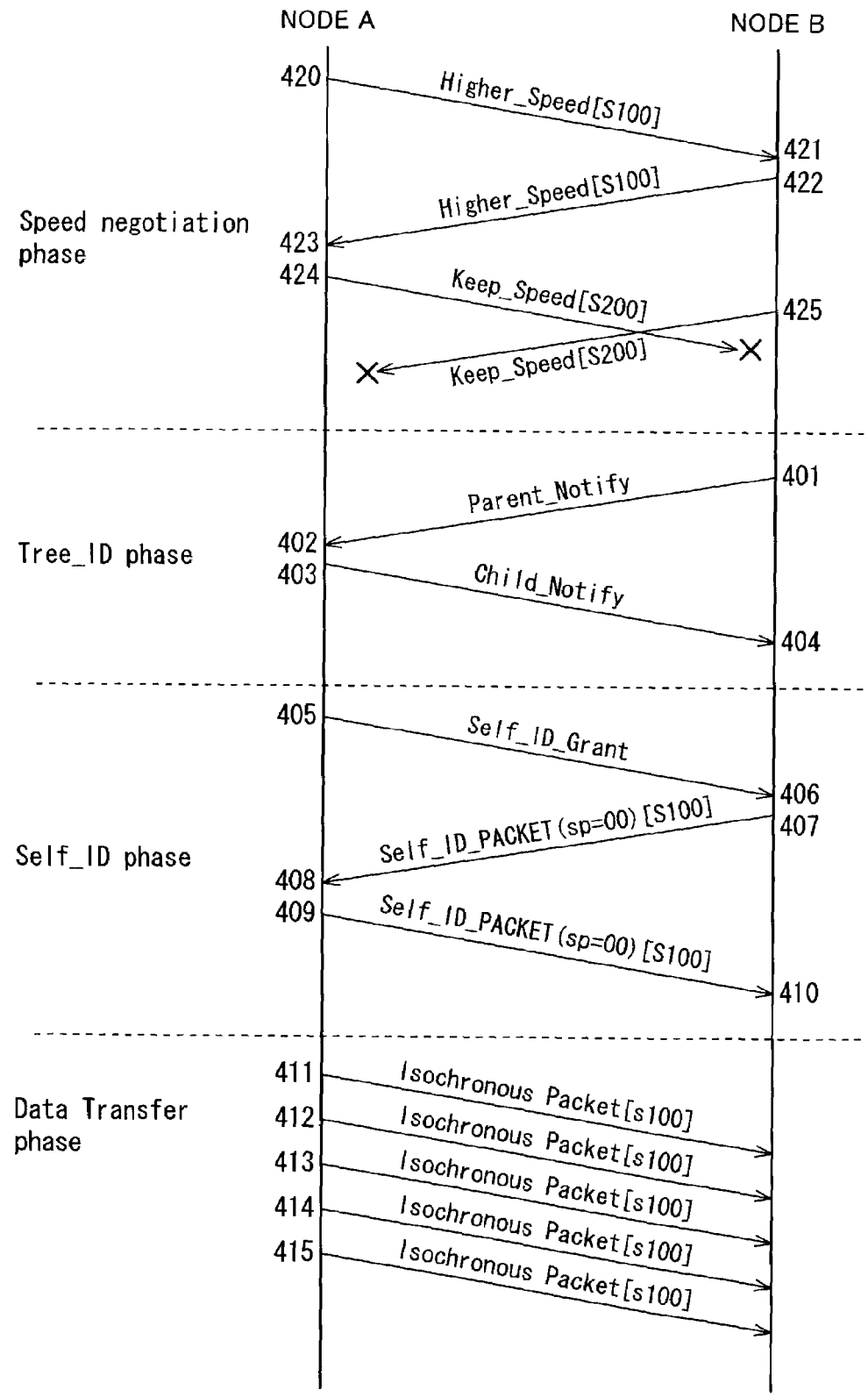
FIG. 4 is a timing chart of a phase shift between nodes which provide maximum transfer speed of S200 when an error rate is high in a channel of S200, in case where the present embodiment is applied.

First, referring to a timing chart shown in FIG. 4, the following will describe transmitting and receiving operation of a signal between terminal apparatuses (nodes) which are provided with transmitting and receiving circuits of the above arrangement. The timing chart shown in FIG. 4 indicates an example of a Peer to Peer connection between a node A and a node B.

In the transmitting and receiving circuit of the present embodiment, a Speed negotiation phase is provided in the timing chart indicating from a Tree_ID phase to a Data Transfer phase in accordance with the IEEE1394. In FIG. 4, both facing output ports of the node A and the node B have a maximum transfer speed of S200; both the node A and the node B have a maximum transfer speed of S200.

That is, it is defined in FIG. 4 that each of the node A and the node B is provided with one transceiver of the maximum transfer speed of S200, and the transceivers are connected to each other. In the present embodiment, in the Speed negotiation phase, which is provided before the Tree_ID phase of the IEEE1394, the maximum transfer possible speed between nodes is determined.

In FIG. 4, at the timings of 420 and 422, the node A and the node B transmit respective codes of Higher_Speed, which represents a request for raise in a transfer speed, at a transfer speed of S100. By receiving the Higher_Speed from each facing node, the node A and the node B recognize that transmitting and receiving is possible at the transfer speed of S100.

Next, at the timings of 424 and 425, respective codes of Keep_Speed, which represents a request for maintenance of a transfer speed, are transmitted at a transfer speed of S200. In this case, since it is assumed that an error rate is in such a degree that data cannot be transmitted and received at S200, it is impossible to receive the Keep_Speed from each facing node.

Thus, since nodes cannot receive the code of the Keep_Speed from each other at the transfer speed of S200, they give up the transfer speed of S200 and finish the Speed Negotiation phase.

As a result of this, the node A and the node B recognize that the error rate in the channel which connects the node A and the node B is not so low as to be able to transmit and receive packets at S200, and decrease the maximum operation speed (maximum processing speed and maximum transfer speed) of each self-node to S100.

Incidentally, as a method of Speed Negotiation, the protocol shown in FIG. 4 is used here; however, important is a transfer speed which is determined as a result of Speed Negotiation, and the method of the Speed Negotiation is not limited to the foregoing method.

After that, it is shifted to a Tree_ID phase. In this phase, the node that transmits a Parent_Notify and receives a Child_Notify becomes a child node, whereas the node that receives a Parent_Notify and transmits a Child_Notify becomes a parent node.

Operation in the above Tree_ID phase is carried out between all the facing nodes which are connected on the buses. The node that last transmits the Child_Notify becomes a root to manage the bus in subsequent phases. In FIG. 4, the node A is a root.

After the Tree_ID phase ends, the phase is shifted to a Self_ID phase. In this phase, all the nodes transmit on the buses their own node_IDs and maximum processing speeds in accordance with a format of a Self_ID packet in FIG. 3. In FIG. 3, a node_ID and a maximum processing speed of a self-node are assigned in fields of phy_ID and sp, respectively.

In the case of the present embodiment, since the node B has the maximum processing speed of S100 determined in the Speed Negotiation, "00" which represents S100 is assigned in the sp field of the Self_ID packet of the node B and transmitted on the bus at the timing of 407.

After the node A recognizes at the timing of 408 that the maximum processing speed of the node B is S100, "00" is also assigned in the sp field of the Self_ID packet of the node A and transmitted on the bus at the timing of 409 since the node A has the maximum processing speed of S100 determined in the Speed Negotiation.

The node B recognizes the maximum processing speed of the connected node A is S100 because "00" is indicated in the sp field of the received Self_ID packet. In this manner, the Self_ID phase is finished, and it is shifted to a Data Transfer phase.

In the Data Transfer phase, in case where request for data transfer occurs to the node A, the node A transmits data packet at the transfer speed of S100, not at S200 because the node A recognizes the maximum processing speed of the node B as S100. In this manner, it is possible to restrict data transfer of S200 between nodes connected via a channel that an error rate becomes high at S200.

Figure 5:
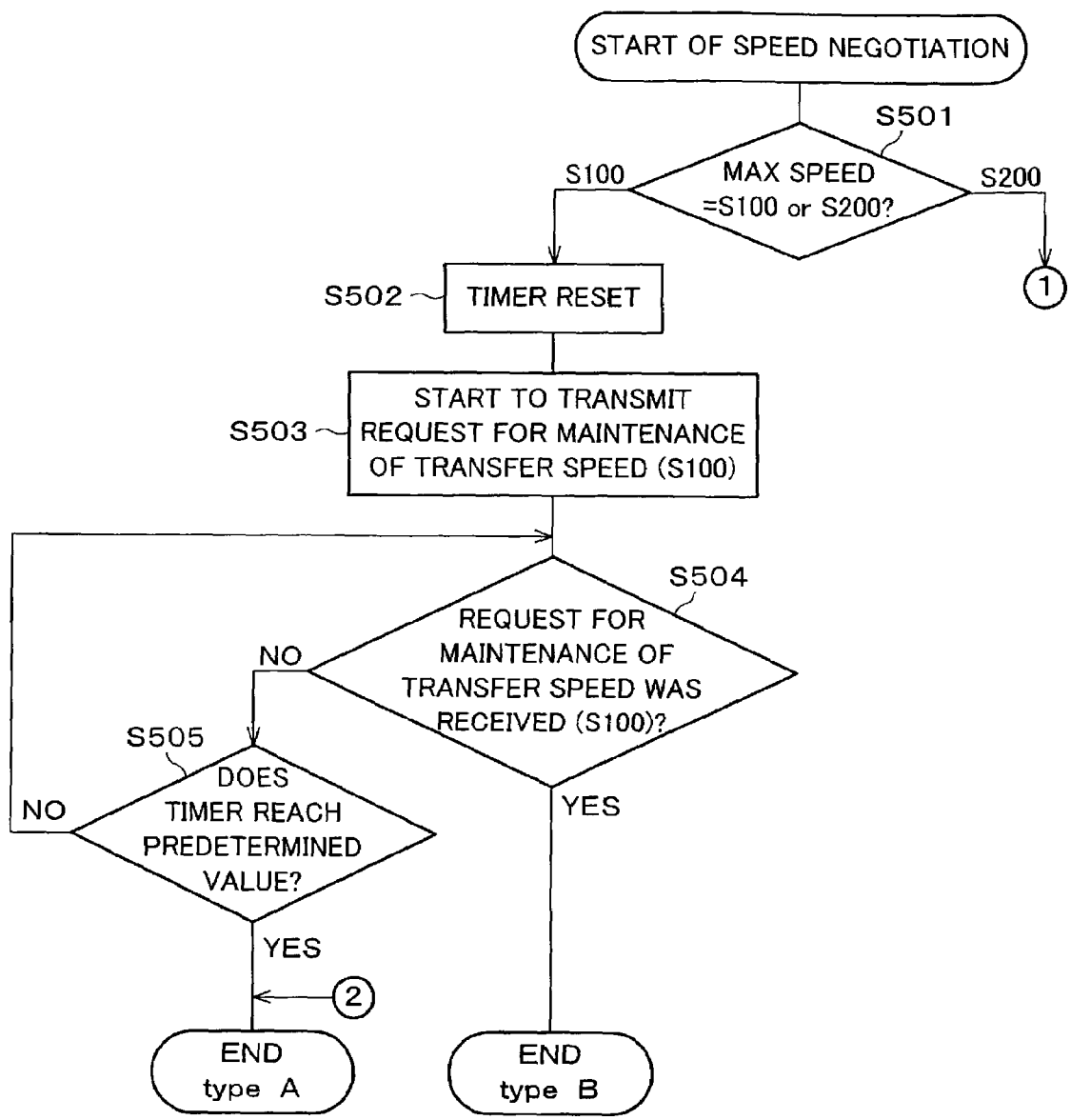
FIG. 5 is a flow chart showing a process of a speed negotiation by the transmitting and receiving circuit shown in FIG. 1.
Figure 6:
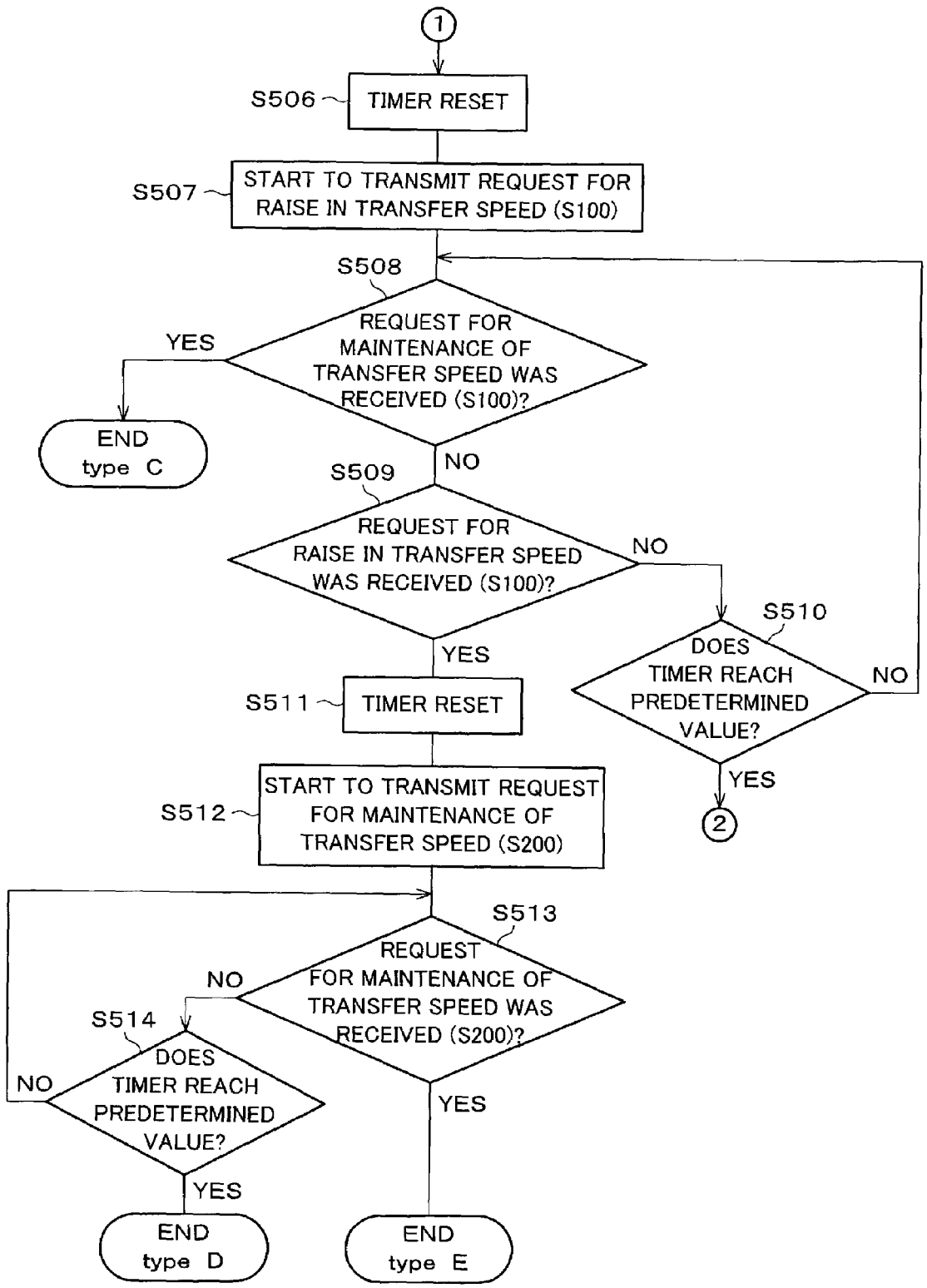
FIG. 6 is a flow chart showing a process of a speed negotiation by the transmitting and receiving circuit shown in FIG. 1.

Here, referring to flowcharts shown in FIG. 5 and FIG. 6, the following will explain a flow of speed negotiation in the speed negotiation state machine 106 of the transmitting and receiving circuit shown in FIG. 1. In FIG. 5 and FIG. 6, it is designed to operate no matter whether transceivers which have a maximum transfer speed of S100 or S200 are connected.

When starting a speed negotiation, the speed negotiation state machine 106 first determines whether a maximum transfer speed (MAX SPEED) of a connected transceiver is S100 or S200 (S501). Here, when the maximum transfer speed is determined to be S100, the flow goes to S502. On the other hand, when the maximum transfer speed is determined to be S200, the flow goes to S506 shown in FIG. 6.

Next, when the maximum transfer speed is determined to be S100, a timer is reset (S502). Then, transmission of request for maintenance of a transfer speed is started at a transfer speed of S100 (S503).

After that, it is determined whether the request for maintenance of the transfer speed of S100 could be received (S504). Here, when the request for maintenance of the transfer speed of S100 was received, it can be confirmed that the maximum transfer speed is S100, and a content indicated as type B in the following Table 1, that is, "00" which represents a maximum transfer speed of S100 is written into the [SPD] region address of the register map in the register circuit 107. Table 1 shows states at the end of the speed negotiation in each of conditions. The above type B indicates that the speed negotiation was finished at the transfer speed of S100.

TABLE 1

| Type | Maximum Transfer Speed | Output to Register |
|------|------------------------|--------------------|
| A    | S100                   | 00                 |
| B    | S100                   | 00                 |
| C    | S100                   | 00                 |
| D    | S100                   | 00                 |
| E    | S200                   | 01                 |

On the other hand, if the request for maintenance of the transfer speed of S100 cannot be received from other node in S504, it is determined whether a timer reaches a predetermined value (S505). Here, when the timer does not reach the predetermined value, the flow goes to S504, and it is determined again whether the request for maintenance of the transfer speed could be received.

Further, in S505, when the timer reach the predetermined value, the content of type A in the above Table 1, that is, "00" which represents a maximum transfer speed of S100 is written into the [SPD] region address in the register map of the register circuit 107.

The above type A indicates that the speed negotiation was finished at the transfer speed of S100.

Next, when the maximum transfer speed is determined to be S200 in the above S501, the speed negotiation state machine 106 reset the timer (S506). Then, transmission of the request for raise in the transfer speed is started at S100 (S507).

Next, it is determined whether the request for maintenance of the transfer speed of S100 was received (S508). Here, when the request for the maintenance of the transfer speed was received, it indicates that the speed negotiation at the transfer speed of S100 is finished, and the content of type C shown in the above Table 1, that is, "00" which represents the maximum transfer speed of S100 is written into the [SPD] region address in the register map of the register circuit 107.

On the other hand, when the request for maintenance of the transfer speed was not received in S508, it is determined whether the request for raise in the transfer speed was received (S509). Here, when the request for raise in the transfer speed was not received, it is determined whether the timer reaches the predetermined value (S510).

In S510, when it is determined that the timer reaches the predetermined value, it indicates that the speed negotiation is finished at the transfer speed of S100, and the content of type A shown in Table 1, that is, "00" which represents the maximum transfer speed of S100 is written into the [SPD] region address in the register map of the register circuit 107.

On the other hand, in S510, when it is determined that the timer does not reach the predetermined value, the flow goes to S508, and the node waits to receive the request for maintenance of the transfer speed.

Further, when it is determined in S509 that the request for raise in the transfer speed is received, the timer is reset (S511).

Next, started is transmission of the request for maintenance of the transfer speed of S200 (S512), and it is determined whether the request for maintenance of the transfer speed of S200 was received (S513). Here, when it is determined that the request for maintenance of the transfer speed was received, it indicates that the speed negotiation was finished at the transfer speed of S200, and the content of type E shown in the above Table 1, that is, "01" which represents the maximum transfer speed of S200 is written into the [SPD] region address of the register map in the register circuit 107.

On the other hand, when it is determined in S513 that the request for maintenance of the transfer speed of S200 is not received, it is determined whether the timer reaches the predetermined value (S514). Here, when it is determined that the timer reaches the predetermined value, it indicates that a proper data transfer cannot be executed at the transfer speed of S200 due to the error rate in a channel connected and that the speed negotiation was finished at the transfer speed of S100, and the content of type D in the above Table 1, that is, "00" which represents a maximum transfer speed of S100 is written into the [SPD] region address of the register map in the register circuit 107.

Further, when it is determined in S514 that the timer does not reach the predetermined value, the flow goes to S513, and it is determined whether the request for maintenance of the transfer speed was received.

Inclusion of the speed negotiation state machine 106 which realizes the flowcharts as shown in FIG. 5 and FIG. 6 enables restriction of the maximum data transfer speed in the transceiver of the node in case where an error rate in the channel is high, and data transfer is impossible at the maximum transfer speed between the transceivers of the nodes. As a result of this, it is possible to ensure data transfer.

[Embodiment 2]

The following will describe another embodiment of the present invention. Note that, in the present embodiment described is a transmitting and receiving circuit which is provided in a serial node corresponding to plural different data transfer speeds.

Figure 7:
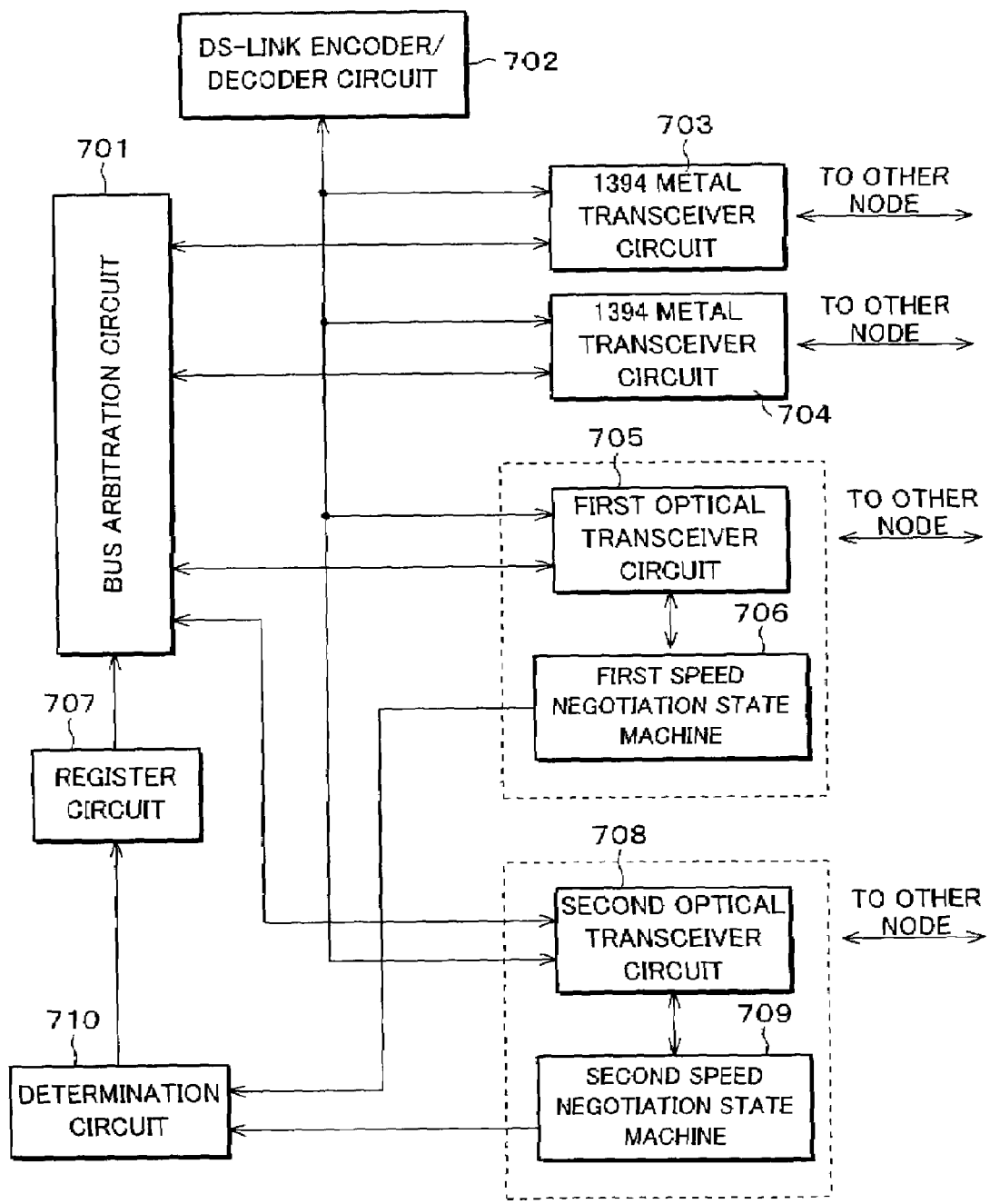
FIG. 7 is a block diagram of a transmitting and receiving circuit according to an embodiment of the present invention.

As shown in FIG. 7, the transmitting and receiving circuit according to the present embodiment is provided with two 1394 metal transceiver circuits 703 and 704, a first optical transceiver circuit (transceiver) 705, a second optical transceiver circuit (transceiver) 708, a first speed negotiation state machine (negotiation circuit) 706 which is connected to the first optical transceiver circuit 705, a second speed negotiation state machine (negotiation circuit) 709 which is connected to the second optical transceiver circuit 708, a DS-link encoder/decoder circuit 702, a bus arbitration circuit (data transfer speed setting circuit) 701, a register circuit (data transfer speed setting circuit) 707, and a determination circuit (selection circuit) 710. Note that, a block diagram shown in FIG. 7 is an example of the present invention, and the present invention is not limited to this.

The 1394 metal transceiver circuits 703 and 704 have functions of (a) inputting and outputting a data signal from and to the DS-link encoder/decoder circuit 702 by connecting to an Encoder output and a Decoder input of the DS-link encoder/decoder circuit 702, of (b) inputting and outputting a control signal from and to the bus arbitration circuit 701 by connecting to the bus arbitration circuit 701, and of (c) transmitting and receiving the data signal and the control signal with a facing node via a medium of a cable.

In the transmitting and receiving circuit of the above arrangement, a transfer speed setting circuit is provided with the bus arbitration circuit 701, the first speed negotiation state machine 706, the register circuit 707, the second speed negotiation state machine 709, and the determination circuit 710. The following will describe these circuits in detail.

Two optical transceiver circuits (the first optical transceiver circuit 705 and the second optical transceiver circuit 708) have functions of (a) inputting and outputting the data signal by connecting to the Decoder output and the Encoder input of the DS-link encoder/decoder circuit 702, of (b) inputting and outputting the control signal from and to the bus arbitration circuit 701 by connecting to the bus arbitration circuit 701, and of (c) transmitting and receiving the data signal and the control signal with the facing node via a medium of an optical fiber.

The DS-link encoder/decoder circuit 702 encodes data from the two optical transceiver circuits 705 and 708 into a Data-Strobe signal and outputs it to the two 1394 metal transceiver circuits 703 and 704, which are connected on the bus. The DS-link encoder/decoder circuit 102 conversely decodes the Data-Strobe signal from the two 1394 metal transceiver circuits 703 and 704 and outputs it to the two optical transceiver circuits 705 and 708.

The bus arbitration circuit 701, which is connected to four transceiver circuits: the two 1394 metal transceiver circuits 703 and 704 and the two optical transceiver circuit 705 and 708, controls input and output of signals in the four transceiver circuits.

Further, the bus arbitration circuit 701 transfers setting information (maximum operation speed) of a self-node to each of the transceiver circuits, and the setting information is transferred to the respective facing nodes which are connected to the transceiver circuits.

The register circuit 707, which has a register map as shown in FIG. 2, is connected to the bus arbitration circuit 101 so as to read setting values from the bus arbitration circuit 701.

The two speed negotiation state machines 706 and 709 have function of executing speed negotiation with the respective facing nodes and of outputting the thus obtained maximum transfer speed to the determination circuit 710.

The determination circuit 710 is connected to the two speed negotiation state machines 706 and 709 so as to select a lower transfer speed among the two maximum transfer speeds outputted from the speed negotiation state machines 706 and 709 and output it to a [SPD] region of the register map in the register circuit 707.

As described above, in the transmitting and receiving circuit which has a plurality of optical transceivers, the transceivers have respective speed negotiation state machines, and the speed negotiation state machines individually execute speed negotiations. The lowest maximum transfer speed among the maximum transfer speeds thus obtained by the speed negotiations is outputted by the determination circuit to the [SPD] region address. The value in the [SPD] region address is set as a maximum transfer speed of the node. This makes it possible to restrict a maximum data transfer speed with respect to the transceiver of the node in the transmitting and receiving circuit which has a plurality of optical transceivers in case where the nodes are connected via a channel of a high error rate.

Figure 8:
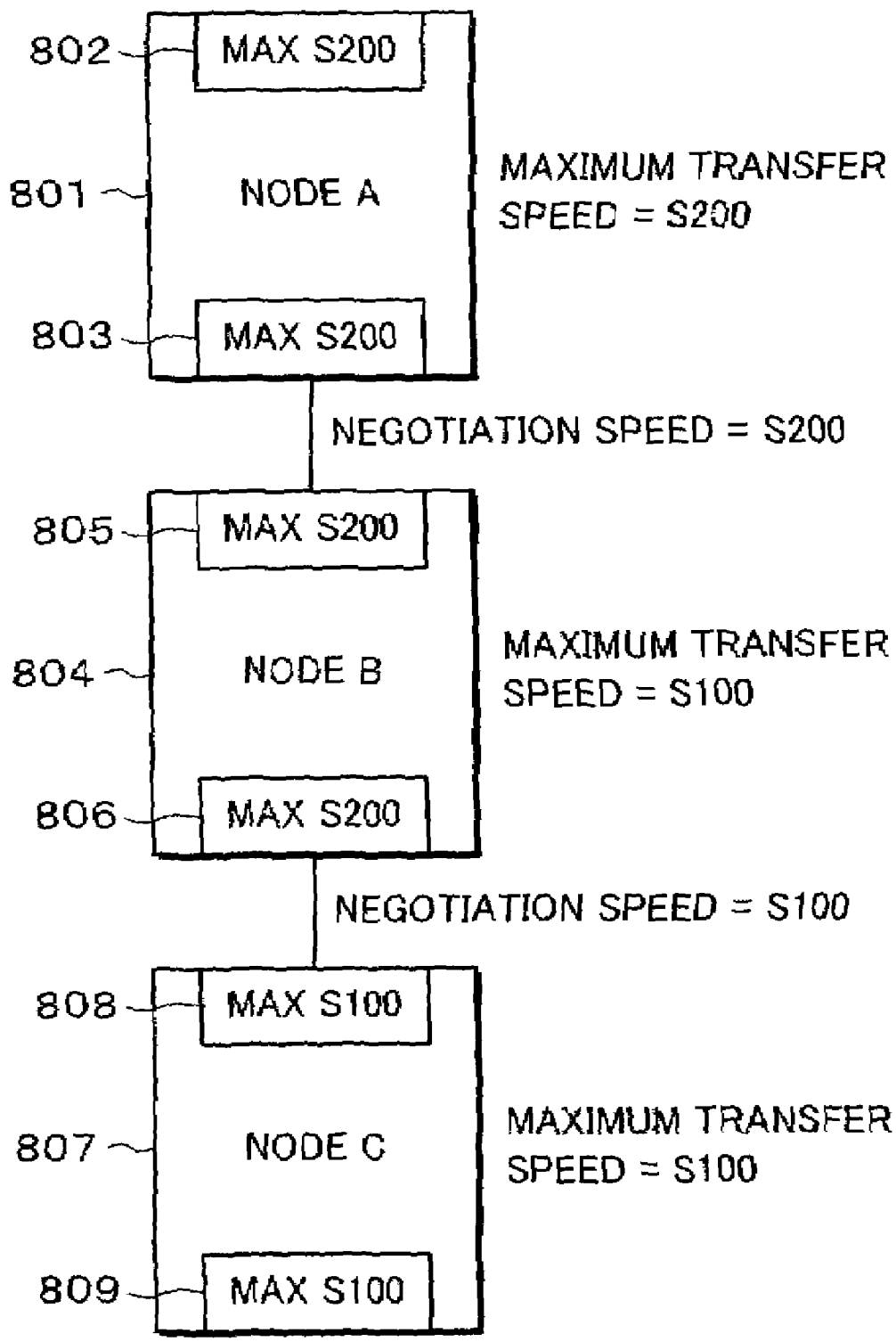
FIG. 8 is a drawing showing the state of daisy-chained nodes which are provided with the transmitting and receiving circuits shown in FIG. 7.

Here, as shown in FIG. 8, considered is speed negotiation between nodes in case of daisy-chained three 1394 nodes which have the transmitting and receiving circuits of the above arrangement.

In FIG. 8, each of a node A(801) and a node B(804) has two optical transceivers of a maximum transfer speed of S200. A node C(807) has two optical transceivers of a maximum transfer speed of S100. That is, the node A(801) has optical transceivers 802 and 803, the node B(804) has optical transceivers 805 and 806, and the node C(807) has optical transceivers 808 and 809.

Further, the optical transceiver 803 of the node A(801) is connected to the optical transceiver 805 of the node B(804), and the optical transceiver 806 of the node B(804) is connected to the optical transceiver 808 of the node C(807).

Between the nodes, executed is the foregoing speed negotiation by the speed negotiation state machines such as the first speed negotiation state machine 706. In case where low enough are both error rates of channels between the node A(801) and the node B(804) and between the node B(804) and the node C(807), the maximum transfer speed of the node A(801) is determined to be S200, and that of the node B(804) and the node C(807) is determined to be S100.

In the above case, the node A(801) recognizes that the node B(804) has the maximum transfer speed of S100, so that the node A(801) cannot transfer data at the transfer speed of S200. This is because the maximum transfer speeds between the transceivers after speed negotiations are always outputted to the [SPD] region address of the register map in the register circuit.

Then, in the following embodiment 3, it is arranged so that output of a maximum transfer speed by a speed negotiation state machine is restricted only in case where a channel is judged to have a high error rate and to be of poor quality.

[Embodiment 3]

The following will describe still another embodiment of the present invention. The block diagram of a transmitting and receiving circuit according to the present embodiment is the same as that of FIG. 1 described in the Embodiment 1. Since modules except for the speed negotiation state machine 106 have the same functions as described in the Embodiment 1, the explanation of thereof is omitted here.

As shown in FIG. 1, the transmitting and receiving circuit according to the present embodiment has a speed setting circuit which is provided with a negotiation circuit (a speed negotiation state machine 106, a signal conversion circuit 108, and a conversion table 109) and a data transfer speed setting circuit (a bus arbitration circuit 101 and a register circuit 107). The negotiation circuit executes speed negotiation for finding a maximum value of a data transfer speed that an error rate in a channel between nodes is within a predetermined range. The data transfer speed setting circuit is arranged so that only in case where the maximum value of the data transfer speed obtained as a result of the speed negotiation by the negotiation circuit is different from a maximum data transfer speed of an optical transceiver circuit 105, the thus obtained maximum value of the data transfer speed is set as a maximum data transfer speed in each transceiver.

Figure 9:
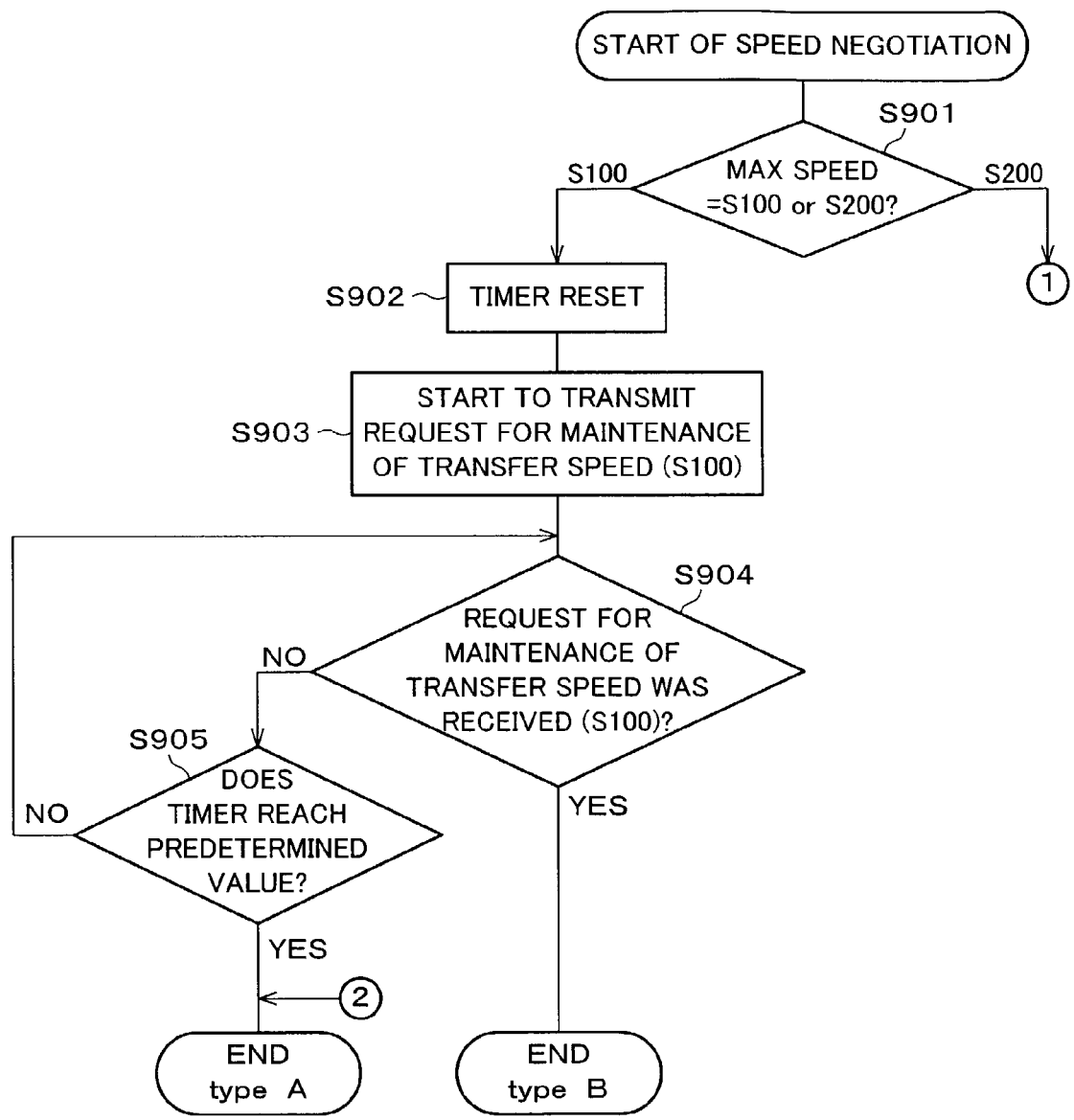
FIG. 9 is a flow chart showing a process of a speed negotiation by the transmitting and receiving circuit shown in FIG. 7.
Figure 10:
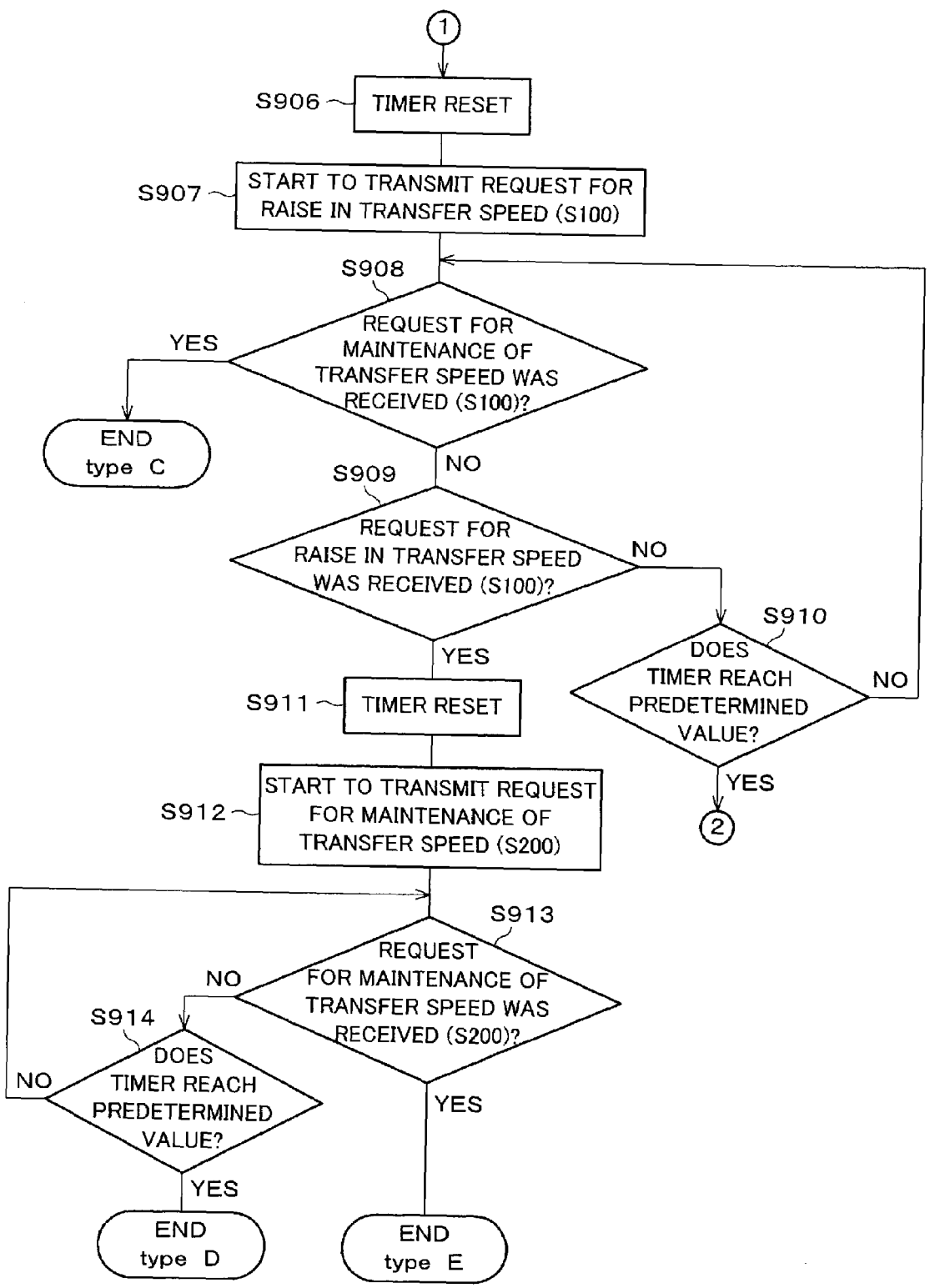
FIG. 10 is a flow chart showing a process of a speed negotiation by the transmitting and receiving circuit shown in FIG. 1.
Figure 11:
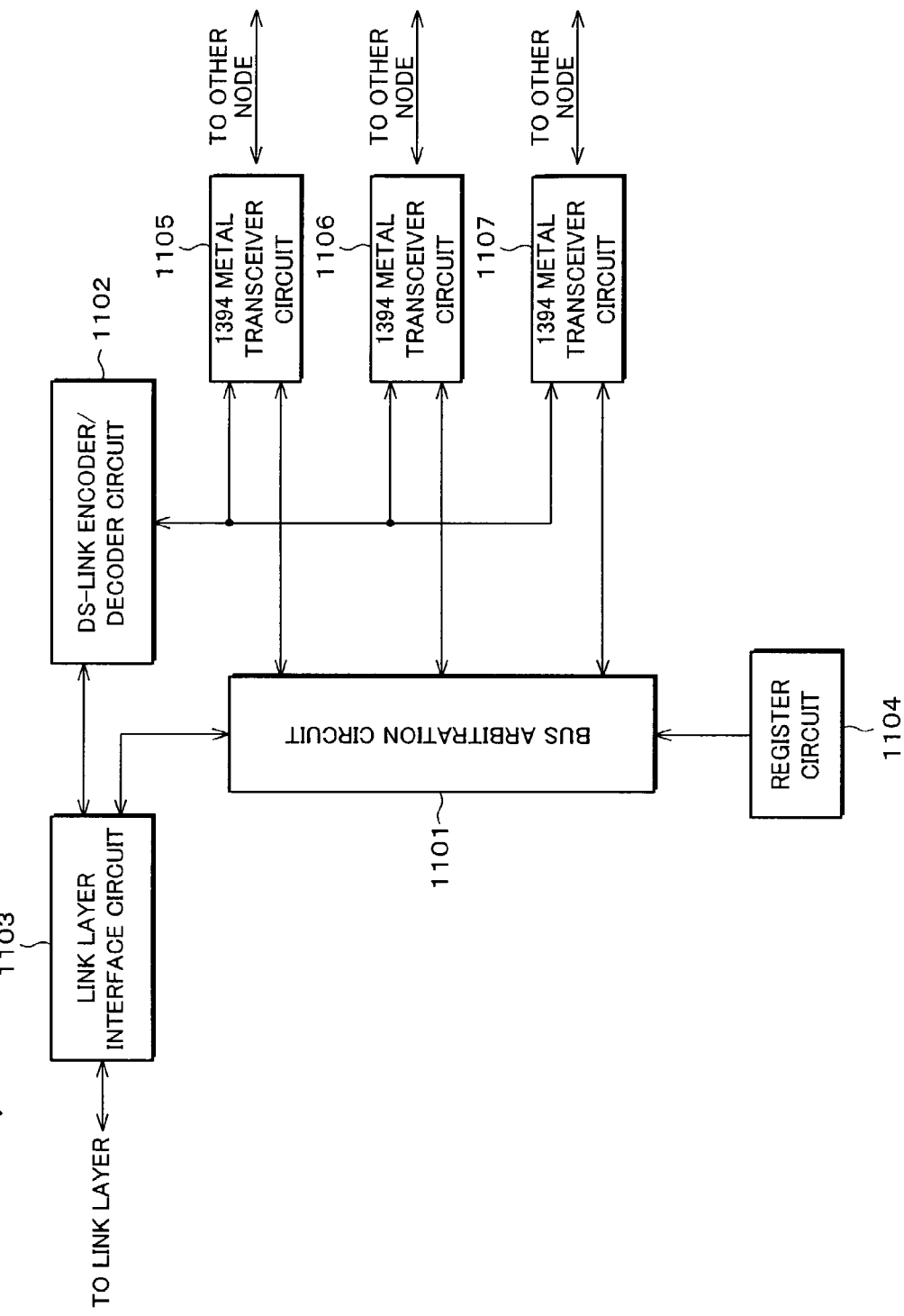
FIG. 11 is a block diagram of a conventional transmitting and receiving circuit.

Here, referring to flowcharts shown in FIG. 9 and FIG. 10, the following will explain a flow of speed negotiation in a speed negotiation state machine 106 which is arranged in the speed setting circuit of the transmitting and receiving circuit in the present embodiment. Note that, the transmitting and receiving circuit according to the present embodiment is designed to operate no matter whether transceivers which have a maximum transfer speed of S100 or S200 are connected.

When starting a speed negotiation, the speed negotiation state machine 106 first determines whether a maximum transfer speed (MAX SPEED) of a connected transceiver is S100 or S200 (S901). Here, when the maximum transfer speed is determined to be S100, the flow goes to S902. On the other hand, when the maximum transfer speed is determined to be S200, the flow goes to S906 shown in FIG. 6.

Next, when the maximum transfer speed is determined to be S100, a timer is reset (S902). Then, transmission of request for maintenance of a transfer speed is started at a transfer speed of S100 (S903).

After that, it is determined whether the request for maintenance of the transfer speed of S100 could be received (S904). Here, when the request for maintenance of the transfer speed of S100 was received, it can be confirmed that the maximum transfer speed is S100, and a content indicated as type B in the following Table 2, that is, "00" which indicates a maximum transfer speed of S100 is written into the [SPD] region address of the register map in the register circuit 107. Table 2 shows states at the end of the speed negotiation and qualities of a channel in each of conditions. The above type B indicates that the quality of the channel is good, and that the speed negotiation was finished at the transfer speed of S100.

TABLE 2

| Type | Quality of Channel | Maximum Transfer Speed | Output to Register |
|------|--------------------|------------------------|---------------------|
| A    | poor               | S100                   | 00                  |
| B    | good               | S100                   | 00                  |
| C    | good               | S200                   | 01                  |
| D    | poor               | S100                   | 00                  |
| E    | good               | S200                   | 01                  |

On the other hand, if the request for maintenance of the transfer speed of S100 cannot be received from other node in S904, it is determined whether a timer reaches a predetermined value (S905). Here, when the timer does not reach the predetermined value, the flow goes to S904, and it is determined again whether the request for maintenance of the transfer speed could be received.

Further, in S905, when the timer reach the predetermined value, the content of type A in the above Table 2, that is, "00" which represents that a channel is so poor that proper data transfer cannot be carried out even at the transfer speed of S100, and that a maximum transfer speed is S100 is written into the [SPD] region address in the register map of the register circuit 107.

Note that, in the present embodiment is not discussed outputs of a transceiver and a speed negotiation state machine which are connected via such a channel that proper data transfer cannot be carried out even at the transfer speed of S100.

Then, when the maximum transfer speed is determined to be S200 in the above S901, the speed negotiation state machine 106 reset the timer (S906). Then, transmission of the request for raise in the transfer speed is started at S100 (S907).

Next, it is determined whether the request for maintenance of the transfer speed of S100 was received (S908). Here, when the request for the maintenance of the transfer speed was received, it indicates that the speed negotiation at the transfer speed of S100 is finished, and the content of type C shown in the above Table 2, that is, "00", which indicates that the quality of the channel is good, and that the maximum transfer speed is S100 is written into the [SPD] region address in the register map of the register circuit 107.

On the other hand, when the request for maintenance of the transfer speed was not received in S908, it is determined whether the request for raise in the transfer speed was received (S909). Here, when the request for raise in the transfer speed was not received, it is determined whether the timer reaches the predetermined value (S910).

In S910, when it is determined that the timer reaches the predetermined value, it indicates that the speed negotiation is finished at the transfer speed of S100, and the content of type A shown in Table 2, that is, "00" which represents that a channel is so poor that proper data transfer cannot be carried out even at the transfer speed of S100, and that the maximum transfer speed is S100 is written into the [SPD] region address in the register map of the register circuit 107.

On the other hand, in S910, when it is determined that the timer does not reach the predetermined value, the flow goes to S908, and the node waits to receive the request for maintenance of the transfer speed.

Further, when it is determined in S909 that the request for raise in the transfer speed is received, the timer is reset (S911).

Next, started is transmission of the request for maintenance of the transfer speed of S200 (S912), and it is determined whether the request for maintenance of the transfer speed of S200 was received (S913). Here, when it is determined that the request for maintenance of the transfer speed was received, it indicates that the speed negotiation was finished at the transfer speed of S200, and the content of type E shown in the above Table 2, that is, "01" which represents that the quality of the channel is good, and that the maximum transfer speed is S200 is written into the [SPD] region address of the register map in the register circuit 107.

On the other hand, when it is determined in S913 that the request for maintenance of the transfer speed of S200 is not received, it is determined whether the timer reaches the predetermined value (S914). Here, when it is determined that the timer reaches the predetermined value, it indicates that a proper data transfer cannot be executed at the transfer speed of S200 due to the error rate in a connected channel and that the speed negotiation was finished at the transfer speed of S100, and the content of type D in the above Table 1, that is, "00" which represents a maximum transfer speed of S100 is written into the [SPD] region address of the register map in the register circuit 107.

Further, when it is determined in S914 that the timer does not reach the predetermined value, the flow goes to S913, and it is determined whether the request for maintenance of the transfer speed was received.

Inclusion of the speed negotiation state machine 106 which realizes the flowcharts as shown in FIG. 9 and FIG. 10 enables restriction of the maximum data transfer speed in the transceiver of the node only in case where an error rate in the channel is high, and data transfer is impossible at the maximum transfer speed between the transceivers of the nodes.

As described above, only in case of the channel of poor quality, the maximum value of the data transfer speed, which was obtained from the result of the speed negotiation, is set as the maximum data transfer speed of the optical transceiver circuit 105, and the data transfer is carried out at the maximum data transfer speed. On the other hand, in case of the channel of good quality, data transfer is carried out at the original maximum data transfer speed of the optical transceiver circuit 105. This makes proper data transfer possible even in case of daisy-chained plural nodes whose transceivers have different maximum transfer speeds.

[Embodiment 4]

The following will describe still another embodiment of the present invention. Note that, the block diagram of a transmitting and receiving circuit according to the present embodiment is the same as that of FIG. 7 described in the Embodiment 2, and operations of a speed negotiation state machine which is connected to each optical transceiver of FIG. 7 is shown in flowcharts of FIG. 9 and FIG. 10. Note that, the present invention is not limited to the present block diagram.

Thus, in a transmitting and receiving circuit which has a plurality of optical transceivers, the speed negotiation state machine to restrict a maximum transfer speed for each optical transceiver only in case where a channel has a high error rate carry out speed negotiation for each optical transceiver. The lowest maximum transfer speed among the thus obtained maximum transfer speeds is outputted by a determination circuit to a [SPD] region address in a register map of a register circuit, and the value in the [SPD] region address is set as the maximum transfer speed of a node. This makes it possible to determine a optimum maximum transfer speed in case where a channel of a high error rate is connected.

The transmitting and receiving circuit of the present invention may be indicated as follows.

That is, the transmitting and receiving circuit of the present invention, a transmitting and receiving circuit of a serial bus node corresponding to a plurality of transfer speeds, may have an arrangement that included are a plurality of transceivers, a bus arbitration circuit which has a function of bus arbitration for the plurality of transceivers, a register circuit which determine an operational conditions of the bus arbitration circuit, and a speed negotiation state machine circuit which is connected to the plurality of transceivers, wherein a transfer speed determined by a speed negotiation with a facing transceiver is set in the register region from outside as a maximum transfer speed of the transceiver.

Further, the speed negotiation state machine circuit is independently positioned with at least two transceivers among the plurality of transceivers, and the transmitting and receiving circuit may have a determination circuit for determining output values of the plurality of speed negotiation state machine circuits, selecting the output value that the operation speed in the transmitting and receiving circuit is lowest in the output values of the plurality of speed negotiation state machine circuits, and writing the selected output value as a specified value in the register region of the register circuit.

The transmitting and receiving circuit of the present invention, a transmitting and receiving circuit of a serial bus node corresponding to a plurality of transfer speeds, may have an arrangement that included are a plurality of transceivers, a bus arbitration circuit which has a function of bus arbitration for the plurality of transceivers, a register circuit which determine an operational conditions of the bus arbitration circuit, and a speed negotiation state machine circuit which is connected to the plurality of transceivers, wherein in case where it is judged by the speed negotiation with the facing node that data transfer cannot be carried out at the transfer speed of the maximum transfer speed with the facing transceiver due to a channel of a high error rate, a transfer speed at the time of speed negotiation is regarded as a maximum transfer speed of the self transceiver, or in case where the transfer speed at the time of speed negotiation is a maximum transfer speed with the facing transceiver in a channel of no errors, the maximum transfer speed of the self transceiver is as used, and values of these maximum transfer speeds is set in the register circuit from outside.

The speed negotiation state machine circuit is independently positioned with at least two transceivers among the plurality of transceivers, and the transmitting and receiving circuit may have a determination circuit for determining output values of the plurality of speed negotiation state machine circuits, selecting the output value that the operation speed in the transmitting and receiving circuit is lowest in the output values of the plurality of speed negotiation state machine circuits, and writing the selected output value as a specified value in the register region of the register circuit.

According to the transmitting and receiving circuit of the present invention, the speed negotiation circuit is connected to the optical transceiver so as to carry out a speed negotiation before data transfer and to output the maximum transfer speed determined by the speed negotiation to the [SPD] region address of the register circuit. This makes it possible to ensure data transfer without setting the maximum transfer speed of the node to such a transfer speed that an error rate is high.

Further, in the transmitting and receiving circuit having a plurality of optical transceivers, each of the optical transceivers is connected to a speed negotiation circuit so as to execute speed negotiation for each transceiver, and the determination circuit selects the lowest transfer speed among the maximum transfer speeds determined by the speed negotiation and outputs it to the [SPD] region address of the register circuit. This makes it possible to ensure data transfer without setting the maximum transfer speed of the node to such a transfer speed that an error rate is high.

Further, in the speed negotiation state machine circuit, only in case where it is determined that an error rate is high, and that a quality of the channel is poor, the maximum transfer speed of the transceiver is restricted. In case where it is determined that a quality of the channel is good, the maximum transfer speed of the transceiver is outputted to the [SPD] region address of the register circuit. This makes it possible to restrict the maximum transfer speed only in case of a channel which has a high error rate.

Further, in the transmitting and receiving circuit having a plurality of optical transceivers, the speed negotiation state machine circuit which restricts the maximum transfer speed only in case of a channel which has a high error rate is connected to each optical transceiver so as to execute speed negotiation for each transceiver before data transfer. The determination circuit select the lowest transfer speed among the maximum transfer speeds determined by the speed negotiation and outputs it to the [SPD] region address of the register circuit. This allows the node to set an optimum transfer speed as the maximum transfer speed.

Note that, in each of the above embodiments, explained is a case of a communication standard of IEEE1394. The present invention is not limited to this. Since the present invention is effective in case where a standard for communications of one node which corresponds to a plurality of transfer speeds is applied to optical communications, it is applicable to, for example, USB (universal serial bus) 2.0 and Ethernet®, other than the above IEEE1394.

As described above, in the transmitting and receiving circuit of the present invention, the data transfer speed in the channel is a speed that an error rate of data transfer in the channel is within a predetermined range.

That is, errors generally occur in a channel between nodes during data transfer. However, if a rate of the error occurrence is within a predetermined range, data transfer is possible without any problems. For example, in the case of OP i.LINK®, which is a standard for communications utilizing a channel of an optical fiber, an error rate (bit error rate) in a channel during data transfer is indicated by a ratio of bit error to the number of bit in whole data. When the rate is not more than $1.0 \times 10^{-12}$, data transfer in the channel is carried out without any problems.

Therefore, the data transfer speed in the channel between the above nodes has only to be such a speed that the error rate in the channel during data transfer is within a predetermined range.

In this case, since detected is such a data transfer speed that the error rate in the channel between the nodes during data transfer is within the predetermined range, the data transfer speed to ensure data transfer can be detected. This makes it further possible to ensure data transfer.

The above speed setting circuit may be provided with, for example, a negotiation circuit which is connected to each transceiver so as to execute speed negotiation for finding a maximum value of data transfer speed in a channel between nodes, and a data transfer speed setting circuit which sets the maximum value of data transfer speed obtained as a result of the speed negotiation by the negotiation circuit as the maximum transfer speed of each of transceiver.

A communication standard applicable to the present invention is, for example, IEEE Std. 1394-1995. The IEEE Std. 1394-1995 defines three types of maximum operation speeds (which indicates both maximum processing speed and maximum transfer speed of a node) of a transceiver of a transmitting and receiving circuit: 100 Mbps, 200 Mbps, and 400 Mbps (hereinafter referred to as "S100", "S200", and "S400", respectively).

In the above negotiation circuit, the following speed negotiation is therefore executed. Here, considered is the case where a self node and a facing node have a maximum transfer speed of, for example, S400. First, they transmit to each other a control code for speed negotiation (hereinafter simply referred to as control code) at a transfer speed of S100 via a channel. At this point, if they can receive the signal from each other, they transmit to each other the control code at a transfer speed of S200.

Then, if they can receive from each other the control code at the transfer speed of S200, they further transmit to each other the control code at a transfer speed of S400. At this point, if they can receive the signal from each other, they set S400 as a maximum transfer speed of each transceiver of the nodes and know that it is possible to ensure data transfer at S400.

On the other hand, if they cannot receive the code transmitted to each other at S400, they set S200 as a maximum transfer speed of each transceiver of the nodes and data transfer is carried out at S200.

In this manner, before data transfer, the speed negotiation in the channel between the nodes is carried out. By reflecting the result of the speed negotiation to the maximum transfer speed of each transceiver of the nodes, it is possible to carry out data transfer at the maximum transfer speed corresponding to the quality of the channel.

Further, the negotiation circuit is independently connected to at least two transceivers among the plurality of transceivers, and the transmitting and receiving circuit may have a selection circuit for selecting such an output value that the operation speed is the lowest in the output values of the plurality of negotiation circuits, and outputting the selected value as a maximum data transfer speed of each transceiver to the data transfer speed setting circuit.

In this case, the maximum transfer speeds of all of the transceiver in the node are set to the data transfer speeds suitable for the quality of the channel, thereby enabling a steady data transfer in the channel.

Further, the speed setting circuit may include: a negotiation circuit, connected to each of the transceivers, which executes a speed negotiation for finding a maximum value of the data transfer speed in the channel between the nodes; and a data transfer speed setting circuit which sets the maximum value of the data transfer speed, obtained as a result of the speed negotiation by said negotiation circuit, as the maximum data transfer speed with respect to each of the transceivers, only in case where the maximum value is different from each maximum data transfer speed obtained from each transfer possible speed of the transceivers and each transfer possible speed of respective facing transceivers.

In this case, when the maximum value of the data transfer speed obtained as a result of the speed negotiation is lower than the maximum transfer speed of each transceiver, it is judged that the quality of the channel is poor. As a result, the obtained data transfer speed is set as a maximum transfer speed of the transceiver to carry out data transfer.

On the other hand, when the maximum value of the data transfer speed obtained as a result of the speed negotiation is the same as the maximum transfer speed of each transceiver, it is judged that the quality of the channel is good. As a result, data transfer is carried out at the maximum data transfer speed of the transceiver.

Thus, only in case where it is judged that the quality of the channel is poor, that is, the error rate in the channel is high as a result of speed negotiation between nodes, the maximum data transfer speed of the transceiver is restricted.

For example, in case of a daisy-chained plurality of nodes whose transceivers have different maximum data transfer speeds, when the maximum value of the transfer speed after the speed negotiation is always set as the maximum data transfer speed of all transceivers, it is possible to ensure data transfer. However, in case where the quality of the channel is good, data transfer may be impossible at the maximum data transfer speed of the transceiver which each node has.

That is, when the quality of the channel is poor, data transfer is effective at the maximum value of the data transfer speed obtained as a result of the speed negotiation. However, when the quality of the channel is good, data transfer is impossible at the original maximum data transfer speed of the transceiver.

However, as described above, only in case of the channel of poor quality, the maximum value of the data transfer speed, which was obtained from the result of the speed negotiation, is set as the maximum data transfer speed of the optical transceiver circuit 105, and the data transfer is carried out at the maximum data transfer speed. On the other hand, in case of the channel of good quality, data transfer is carried out at the original maximum data transfer speed of the optical transceiver circuit 105. This makes proper data transfer possible even in case of daisy-chained plural nodes whose transceivers have different maximum transfer speeds.

Further, the negotiation circuit is independently connected to at least two transceivers among the plurality of transceivers, and the transmitting and receiving circuit may have a selection circuit for selecting such an output value that the operation speed is the lowest in the output values of the plurality of negotiation circuits, and outputting the selected value as a maximum data transfer speed of each transceiver to the data transfer speed setting circuit.

In this case, the above selection circuit sets the lowest transfer speed among the maximum values of the transfer speeds of each transceiver, which are obtained from the speed negotiation, as the maximum data transfer speed of the whole node. This makes it possible to carry out a steady data transfer in the channel.

As the communication standard applied to the channel between the above nodes, the IEEE1394 as described before is named.

Further, the communications between the above nodes may be optical communications.

Thus, if the communications are optical communications, an optical fiber is utilized for the channel. This has the advantage that the length of the optical fiber channel can be extended more than that of metal wiring channel.

Further, in a transmitting and receiving method of the present invention, the data transfer speed in the channel between the above nodes has only to be such a speed that the error rate of data transfer in the channel is within a predetermined range.

In this case, since detected is such a data transfer speed that the error rate in the channel between the nodes during data transfer is within the predetermined range, the data transfer speed to ensure data transfer can be detected. This makes it further possible to ensure data transfer.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A transmitting and receiving circuit comprising:
   a plurality of transceivers for transmitting and receiving data to and from a facing node at plural different data transfer speeds; and
   a speed setting circuit which detects a data transfer speed in a channel between nodes and sets a maximum data transfer speed in accordance with a thus detected value with respect to each of the transceivers,
   wherein said speed setting circuit includes:
   a negotiation circuit, connected to each of the transceivers, which executes a speed negotiation for finding a maximum value of the data transfer speed in the channel between the nodes; and
   a data transfer speed setting circuit which sets the maximum value of the data transfer speed, obtained as a result of the speed negotiation by said negotiation circuit, as the maximum data transfer speed with respect to each of the transceivers, only in case where the maximum value is different from each maximum data transfer speed obtained from each transfer possible speed of the transceivers and each transfer possible speed of respective facing transceivers.

2. The transmitting and receiving circuit according to claim 1, wherein
   the data transfer speed in the channel is a speed whose error rate of data transfer in the channel falls within a predetermined range.

3. The transmitting and receiving circuit according to claim 2, wherein
   said speed setting circuit includes:
   a negotiation circuit, connected to each of the transceivers, which executes a speed negotiation for finding a maximum value of the data transfer speed in the channel between the nodes; and
   a data transfer speed setting circuit which sets the maximum value of the data transfer speed, obtained as a result of the speed negotiation by said negotiation circuit, as the maximum data transfer speed with respect to each of the transceivers.

4. The transmitting and receiving circuit according to claim 3, wherein said negotiation circuit is independently connected to at least two transceivers among said plurality of transceivers,
   said transmitting and receiving circuit, further comprising a selection circuit which selects an output value that is the lowest data transfer speed in each output value of said negotiation circuit and outputs the output value to the data transfer speed setting circuit as each data maximum transfer speed of the transceivers.

5. The transmitting and receiving circuit according claim 2, wherein said negotiation circuit is independently connected to at least two transceivers among said plurality of transceivers,
   said transmitting and receiving circuit, further comprising a selection circuit which selects an output value that is the lowest data transfer speed in each output value of said negotiation circuit and outputs the output value to the data transfer speed setting circuit as each data maximum transfer speed of the transceivers.

6. The transmitting and receiving circuit according to claim 2, wherein the channel between the nodes is based on a communication standard of IEEE1394.

7. The transmitting and receiving circuit according to claim 2, wherein communications between the nodes are optical communications.

8. The transmitting and receiving circuit according to claim 1, wherein
   said speed setting circuit includes:
   a negotiation circuit, connected to each of the transceivers, which executes a speed negotiation for finding a maximum value of the data transfer speed in the channel between the nodes; and
   a data transfer speed setting circuit which sets the maximum value of the data transfer speed, obtained as a result of the speed negotiation by said negotiation circuit, as the maximum data transfer speed with respect to each of the transceivers.

9. The transmitting and receiving circuit according to claim 8, wherein said negotiation circuit is independently connected to at least two transceivers among said plurality of transceivers,
   said transmitting and receiving circuit, further comprising a selection circuit which selects an output value that is the lowest data transfer speed in each output value of said negotiation circuit and outputs the output value to the data transfer speed setting circuit as each data maximum transfer speed of the transceivers.

10. The transmitting and receiving circuit according to claim 8, wherein the channel between the nodes is based on a communication standard of IEEE1394.

11. The transmitting and receiving circuit according to claim 8, wherein communications between the nodes are optical communications.

12. The transmitting and receiving circuit according to claim 1, wherein said negotiation circuit is independently connected to at least two transceivers among said plurality of transceivers,
    said transmitting and receiving circuit, further comprising a selection circuit which selects an output value that is the lowest data transfer speed in each output value of said negotiation circuit and outputs the output value to the data transfer speed setting circuit as each data maximum transfer speed of the transceivers.

13. The transmitting and receiving circuit according to claim 1, wherein the channel between the nodes is based on a communication standard of IEEE1394.

14. The transmitting and receiving circuit according to claim 13, wherein communications between the nodes are optical communications.

15. The transmitting and receiving circuit according to claim 1, wherein the channel between the nodes is based on a communication standard of IEEE1394.

16. The transmitting and receiving circuit according to claim 1, wherein communications between the nodes are optical communications.

17. The transmitting and receiving circuit according to claim 1, wherein communications between the nodes are optical communications.

18. A transmitting and receiving method, comprising the steps of:

(a) executing a speed negotiation for finding a maximum value of a data transfer speed for each transceiver with respect to a channel between nodes before data transfer;

(b) setting a thus obtained maximum value as a maximum data transfer speed with respect to each of the transceivers, the steps (a) and (b) being carried out when data are transmitted and received between nodes whose transceivers are connected to each other, each of the transceivers having a plurality of data transfer speeds at which data can be transferred; and (c) setting the maximum value of the data transfer speed, obtained as a result of the speed negotiation, as the maximum data transfer speed with respect to each of the transceivers, only in case where the maximum value is different from each maximum data transfer speed obtained from each transfer possible speed of the transceivers and each transfer possible speed of respective facing transceivers.

19. The transmitting and receiving method according to claim 18, wherein the data transfer speed in the channel is a speed whose an error rate of data transfer in the channel falls within a predetermined range.

* * * * *